(12) United States Patent
Curry, III et al.

(10) Patent No.: US 11,459,124 B2
(45) Date of Patent: Oct. 4, 2022

(54) ASSEMBLY TOOL FOR FUSELAGE STRUCTURE SPLICE

(71) Applicant: The Boeing Company, Chicago, IL (US)

(72) Inventors: David Howard Curry, III, Mount Pleasant, SC (US); David Raines, Huntsville, AL (US); Scott L. Smotherman, Huntsville, AL (US); Paul Gabriel Werntges, Charleston, SC (US); Dennis Ray Mathis, Charleston, SC (US); Charlie E. Branyon, III, Summerville, SC (US); Daniel B. Freeman, Goose Creek, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/798,220

(22) Filed: Feb. 21, 2020

(65) Prior Publication Data

US 2021/0261231 A1  Aug. 26, 2021

(51) Int. Cl.
*B64F 5/10* (2017.01)
*B64C 1/06* (2006.01)
*B23P 19/04* (2006.01)

(52) U.S. Cl.
CPC ............... *B64F 5/10* (2017.01); *B23P 19/04* (2013.01); *B64C 1/069* (2013.01); *B23P 2700/01* (2013.01); *Y10T 29/49826* (2015.01); *Y10T 29/53* (2015.01)

(58) Field of Classification Search
CPC ....... B23P 19/04; B23P 19/10; B23P 2700/01; B64F 5/10; B64C 1/069
See application file for complete search history.

(56) References Cited

U.S. PATENT DOCUMENTS

| 6,644,081 | B1 * | 11/2003 | Berry | ........................ | B64F 5/10 29/889.6 |
| 8,960,606 | B2 | 2/2015 | Diep et al. | | |
| 2008/0067289 | A1 | 3/2008 | Meyer | | |

OTHER PUBLICATIONS

U.S. Patent and Trademark Office, Non-Final Office Action regarding U.S. Appl. No. 16/798,187, dated Mar. 3, 2022, 19 pages.

* cited by examiner

*Primary Examiner* — Christopher J Besler
(74) *Attorney, Agent, or Firm* — Kolisch Hartwell, P.C.

(57) ABSTRACT

An apparatus for mounting a splice component for joining two or more workpieces includes a base plate and one or more bias assemblies. The base plate includes one or more passageways extending through the base plate and one or more barrier elements mounted proximate to the passageway (s). Each barrier element and associated passageway are configured to freely receive a protrusion of a splice component. The bias assembly includes a bias element that extends proximate to the passageway and is configured to move resiliently to urge the protrusion against the barrier element. The passageway, the barrier element, and the bias assembly are configured to allow movement of the splice component relative to the base plate transverse to a direction of force applied by the bias element on the protrusion.

20 Claims, 14 Drawing Sheets

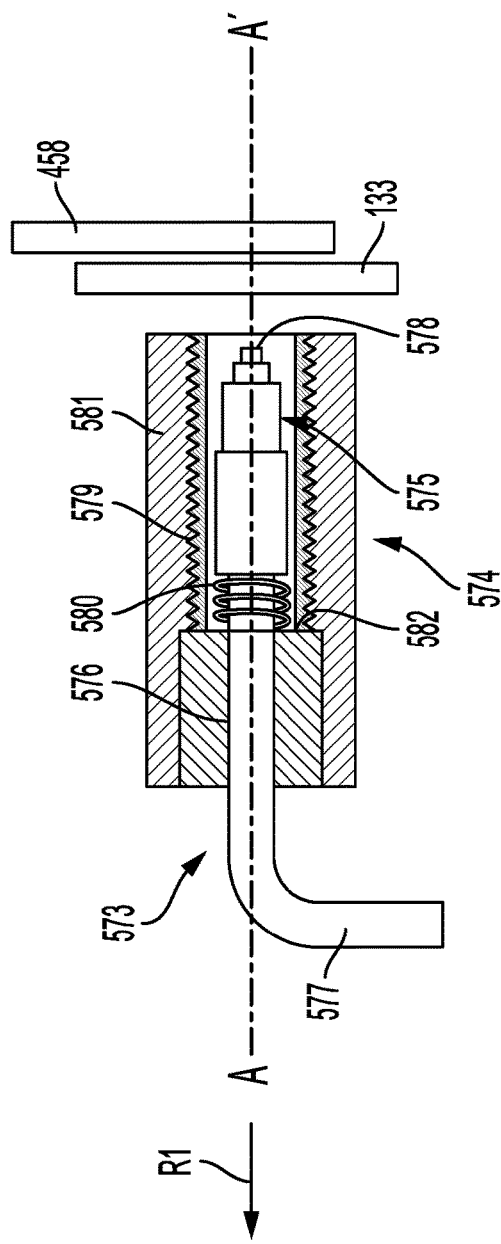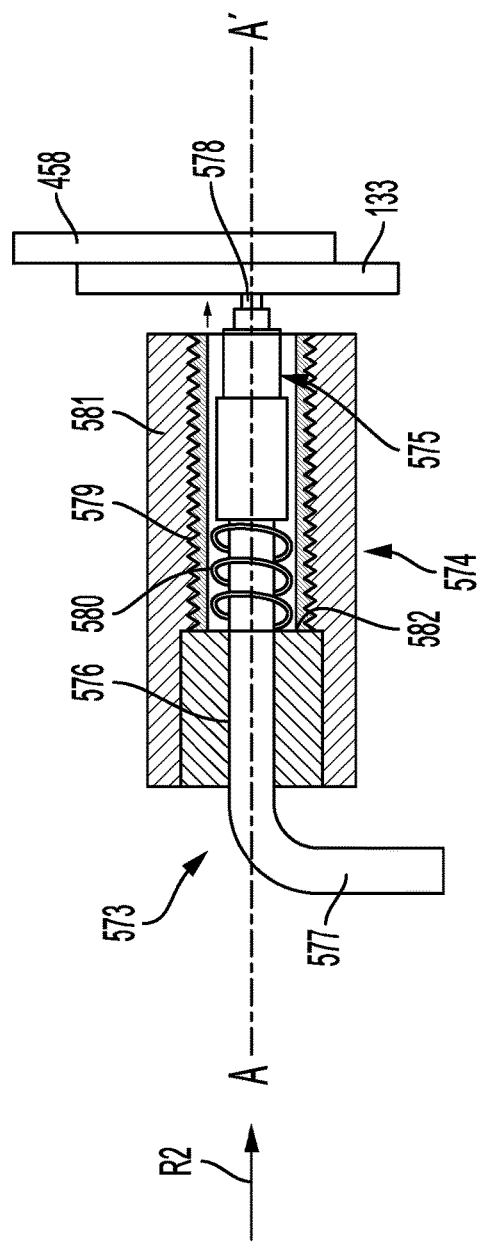

ASSEMBLY TOOL FOR FUSELAGE STRUCTURE SPLICE

FIELD

This disclosure relates to installation of splice structures. More specifically, the disclosed examples relate to systems, apparatus and methods for mounting a splice component for joining two workpieces.

BACKGROUND

Fuselages of aircrafts are often assembled by joining adjacent fuselage sections at splice joints using splice components at an inner face of the fuselage section. Generally, one end of the splice component is attached to a splice strap and the other end is attached to a flange of a stringer. A plurality of such splice components span along the splice joint. Conventionally, accumulated manufacturing variations in individual parts forming the joint splice, leads to mismatches between contacting surfaces of the splice components and the structures onto which the splice components are mounted. This creates gaps that need to be filled with shims. A detailed dimensional analysis of individual gaps may be required to custom design and manufacture shims. Shims add additional weight to the aircraft. Typically, installing individual splice components at the splice joint includes fitting the shims relative to the individual splice components, which adds cost and time to a fuselage assembly process.

SUMMARY

The present disclosure provides systems, apparatuses, and methods relating to an apparatus for mounting a splice component for joining two workpieces. In some examples, the apparatus may include a base plate having a first and second opposite major faces. A passageway extends through the base plate. A barrier element is mounted proximate to the passageway. The passageway and the barrier element are configured to freely receive a protrusion of the splice component. The assembly tool may include a bias assembly mounted relative to the base plate. The bias assembly may include a bias element that extends proximate to the passageway. The bias assembly may be configured to move resiliently in a direction extending along the first major face to urge the protrusion against the barrier element. The passageway, the barrier element, and the bias assembly are configured to allow movement of the splice component relative to the base plate transverse to the direction.

In some examples, an apparatus for mounting at least a fitting of a fuselage structure splice may be provided. The fuselage structure splice includes a panel and a strap mounted on the panel and extending along an edge of the panel. The fuselage structure splice may also include a stringer mounted on the panel and extending away from the edge of the panel, and a fitting having a protrusion. The apparatus includes a base plate having opposite first and second base-plate major faces and a passageway extending through the base plate. The apparatus may also include a barrier element mounted proximate to the passageway. The passageway and the barrier element are configured to freely receive a protrusion of the fitting. The apparatus may further include a bias assembly mounted relative to the base plate, wherein the bias assembly includes a bias element that extends proximate to the passageway, configured to move resiliently in a direction extending along the base-plate major face to urge the protrusion against the barrier element. The passageway, the barrier element, and the bias assembly are configured to allow movement of the fitting relative to the base plate transverse to the direction.

In some examples, a method for installing at least a splice component for splicing at least first and second workpieces together is provided. The method includes supporting the splice component on an installation tool having a base plate with first and second opposite major faces. The method may include positioning a protrusion of the splice component in a passageway extending through the base plate and between a bias element of a biasing assembly mounted relative to the base plate and a barrier element mounted to the base plate proximate to the passageway. The method may include urging the protrusion against the barrier element by resiliently urging the bias element against the protrusion in a direction extending along the first major face. The method may include positioning the installation tool while supporting the splice component with the splice component proximate to the first and second workpieces. The method may include attaching the splice component to the first and second workpieces.

In some examples, a method for making a fuselage structure splice includes supporting a fitting on an installation tool having a base plate with first and second opposite major faces. The method may include positioning a protrusion of the fitting in a passageway extending through the base plate and between a bias element of a biasing assembly mounted relative to the base plate and a barrier element mounted to the base plate proximate to the passageway. The method may include urging the protrusion against the barrier element by resiliently urging the bias element against the protrusion in a direction extending along the first major face. The method may include positioning the installation tool, while supporting the fitting, with the fitting proximate to a strap extending along an edge of a panel and a stringer extending away from the edge of the panel. The method may include attaching the fitting to the strap and the stringer.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIGS. 5A and 5B are simplified schematic diagrams illustrating basic operation of a bias assembly shown in FIG. 3.

DETAILED DESCRIPTION

Figure 1:
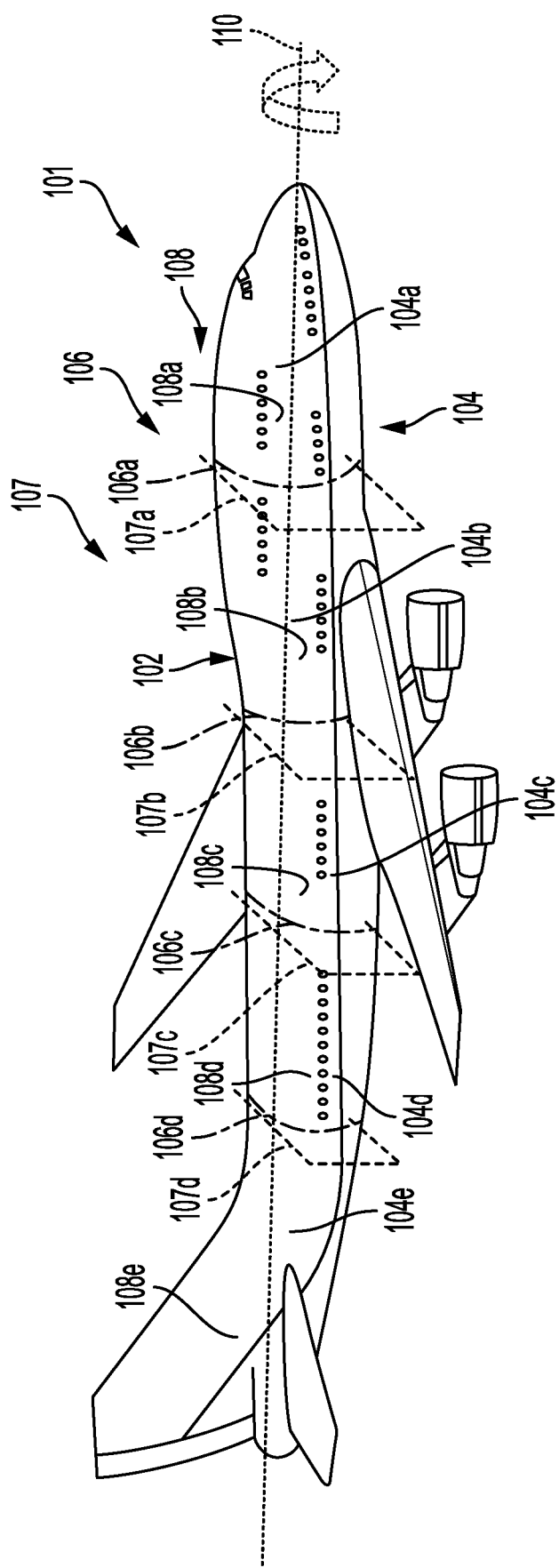
FIG. 1 is a perspective simplified view of an illustrative aircraft assembled in accordance with aspects of the present disclosure.

Various aspects and examples of an assembly tool for a fuselage structure splice, are described below and illustrated in the associated drawings. Unless otherwise specified, an assembly tool in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A-C, each of which is labeled accordingly.

Overview

In general, an assembly tool preferably for a joint splice is described below. The assembly tool preferably includes a base plate including at least a partial opening defining a passageway. The passageway is configured to receive a splice component to be installed at the joint splice. The splice component preferably may include a base and a protrusion extending transversely from the base and forming a general "L" configuration. At least one barrier element may be positioned on the base plate relative to the passageway proximate to a first boundary of the passageway. A second bias assembly may be positioned on the base plate proximate to a second passageway boundary spaced from the first passageway boundary.

The first bias assembly may be configured to urge the protrusion of the splice component against the barrier element. When included, the second bias assembly may be configured to urge the base of the splice component away from the base plate. The first and second bias assemblies may be configured to allow a forward-aft movement of the splice component along the passageway relative to the base plate. The forward-aft movement of the splice component allows for manipulating a position of the splice component to obtain a continuous contact between contacting surfaces of the splice component and the receiving structures of, for example, a fuselage section joint splice. When using an appropriately designed splice component, this allows for assembling the joint splice without shims. An included example of an assembly tool enables receiving and supporting of multiple splice components, allowing for multiple splice components to be kitted together in the assembly tool prior to installing at the splice joint, as well as kitting multiple loaded assembly tools. Further, each of the splice component of the multiple splice components, is configured to be moved and repositioned independent of one another.

In the following description ordinal terms, such as "first", "second", and "third," are used to distinguish or identify various members of each of various groups of items in the order they are introduced in a particular context and are not intended to show serial or numerical limitation, or be fixed identifiers for the group members.

Examples, Components, and Alternatives

The following sections describe selected aspects of exemplary assembly tools for use in building structure splices, such as fuselage structure splices, as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Basic Assembly Tool

Figure 2:
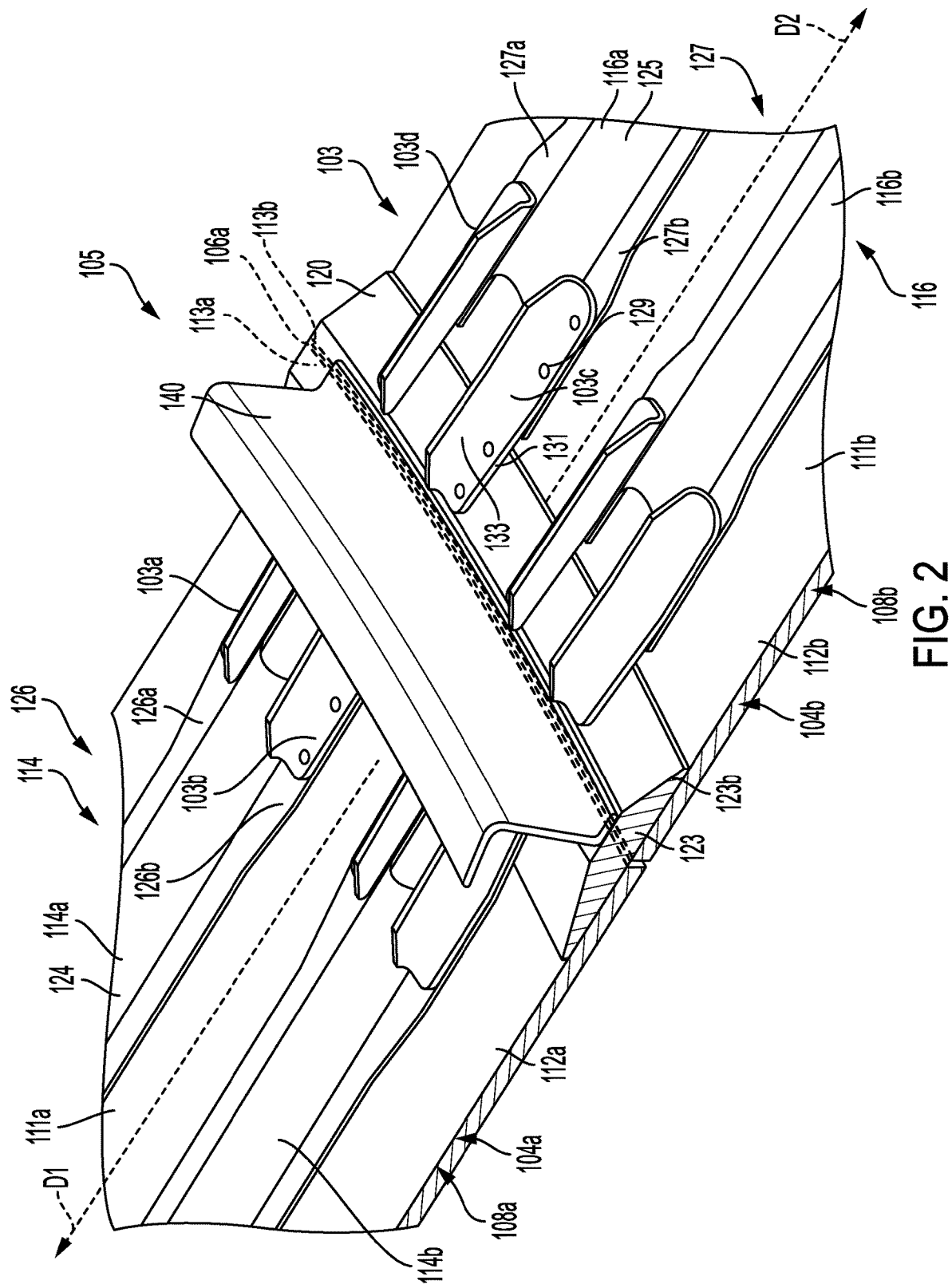
FIG. 2 is a partial isometric view of an example of a splice joint between adjacent fuselage sections of the aircraft of FIG. 1.
Figure 3:
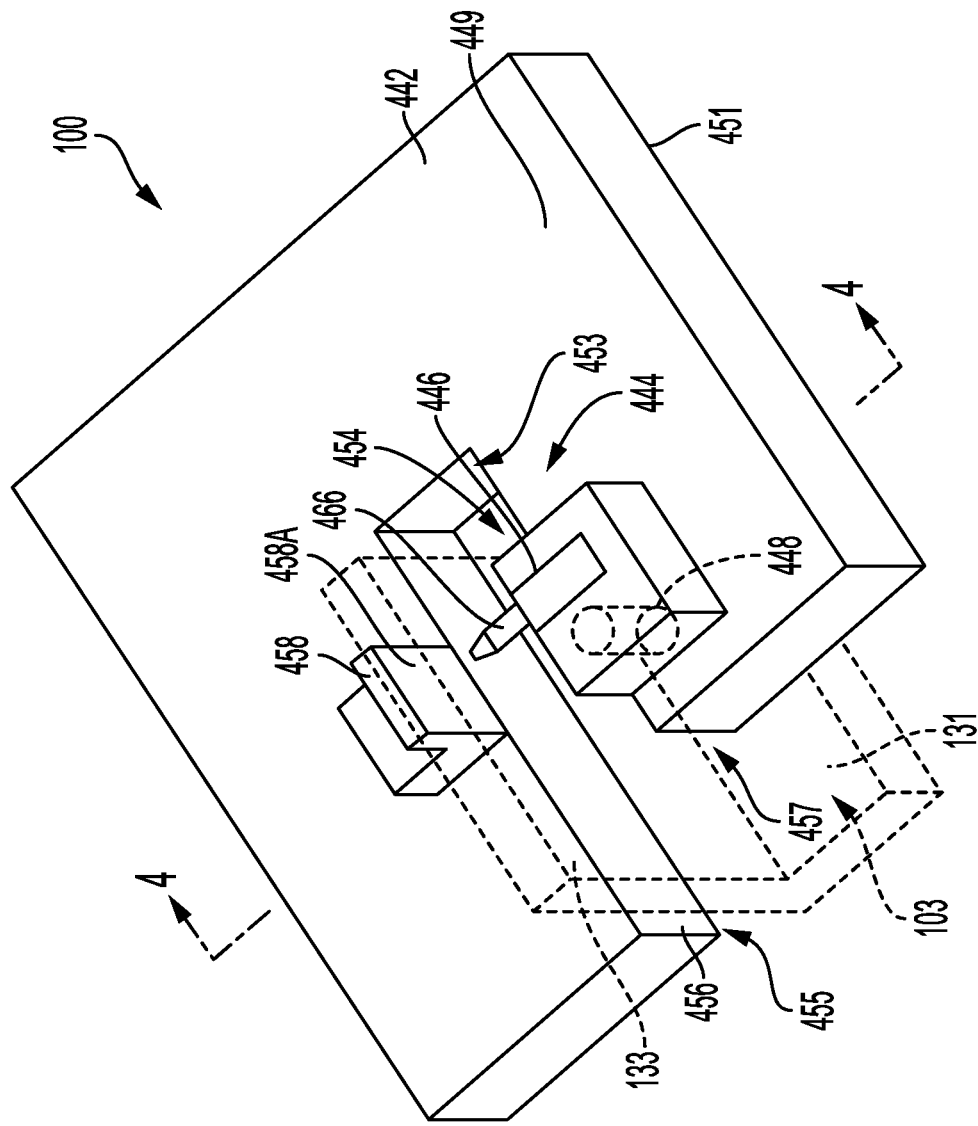
FIG. 3 is an isometric view of an illustrative assembly tool.

As shown in FIGS. 1-6, this section describes a preferred application for use of and illustrative examples of assembly tools, such as assembly tool 100 shown in FIG. 3. Assembly tool 100 is preferably used for building fuselage structure splices, and is a first example of an assembly tool that may be used specifically in installing a splice component at a splice joint for joining airplane sections.

FIG. 1 is a perspective view of an aircraft 101 having a fuselage 102. Fuselage 102 includes a plurality of substantially cylindrical fuselage sections 104 (identified individually as fuselage sections 104a-e) abutting each other along joining lines, called circumferential splice joints 106 (identified individually as splice joints 106a-d). The circumferential joints 106 define planes 107 (identified individually as splice joint planes 107a-d) perpendicular to a longitudinal axis 110 of the fuselage. The joining lines and circumferential joint areas of splice joints 106 provide strength and transfer forces along the fuselage to withstand high stresses the aircraft is subjected to during flight.

Each fuselage section 104a-e may include a composite skin 108, shown as individual skins 108a-e, extending circumferentially around the longitudinal axis 110 of the fuselage 102. Throughout this disclosure, the term "fuselage section" is used for convenience to refer to any airplane shell structure extending circumferentially around an axis. It can be appreciated by one skilled in the art that fuselage sections 104a-e may not be limited to generally cylindrical structures, but may include structures having circular, elliptical, oval, egg-shaped, rectilinear, tapered, or other cross-sectional shapes. In addition, in one example, the fuselage sections 104 can be "one-piece" fuselage sections in which the composite skins 108 are "one-piece" skins extending continuously circumferentially around the longitudinal axis 110. In other examples, however, the skins 108 can be formed from two or more skin segments spliced or otherwise joined together to form the circumferential fuselage section.

FIG. 2 is an enlarged isometric view from within the fuselage 102 (FIG. 1), which is a portion 105 of the first splice joint 106a. The portion of the first fuselage section 104a illustrated in FIG. 2 includes a first panel 112a forming skin 108a with a first panel major face 111a and a first edge 113a. The portion of the second fuselage section 104b illustrated in FIG. 2A includes a second panel 112b forming skin 108b with a second panel major face 111b and a second edge 113b facing first edge 113a. The second edge 113b of the second panel 112b is positioned in edgewise alignment or butted up with the first edge 113a of the first panel 112a to form the splice joint 106a with the first panel major face in alignment with the second panel major face.

In this example, a plurality of stringers 114 (identified individually in FIG. 2 as stringers 114a-b) may be attached to first panel major face 111a of the first panel 112a. The plurality of the stringers extend away from the splice joint 106a in a direction D1 and along the line of direction D1 parallel to the longitudinal axis 110 of aircraft 101 as shown in FIG. 1, and transverse to the splice joint and panel first edge 113a. Each of the stringers 114 may include a pair of flanges and a raised portion 124 extending between the flanges and projecting away from the face of first panel 112a. In the present example, each of the stringers 114 has a pair of flanges, identified individually as a first flange 126a and second flange 126b of stringer 114a, positioned on opposite sides of raised portion 124. The flanges 126a and 126b are attached directly to the first panel 112a and the stringers 114a-b are configured to reinforce, stiffen, and strengthen the first panel 112a.

The second panel 112b can be at least generally similar in structure and function to the first panel 112a described above. Accordingly, the second panel 112b may include a plurality of stringers 116 (identified individually in FIG. 2 as stringers 116a-b) attached to second panel major face 111b of the second panel 112b. The stringers extend away from the splice joint 106a in a direction D2 opposite to D1 and along the line of direction D2, and parallel to the aircraft longitudinal axis 110. Each of the stringers 116 may include a raised portion 125 projecting away from the second panel 112b, and a pair of flanges (identified individually in FIG. 2 as first flange 127a and second flange 127b of stringer 116a). The flanges are attached directly to the second panel 112b and stringers 116a-b are configured to reinforce, stiffen, and strengthen the second panel 112b.

An elongate strap 120 is attached to the first panel major face 111a along the first edge 113a and the second panel major face 111b along the second edge 113b to overlay on and to bridge the splice joint 106a formed by the first panel 112a and the second panel 112b. The strap 120 is attached all along the splice joint extending circumferentially around the inside of the fuselage to join the fuselage section 104a to section 104b, thereby maintaining a smooth, aerodynamic surface on the exterior of the fuselage 102.

The strap may include a strap first surface or strap bottom surface (not seen in FIG. 2) and an opposite strap second surface 123 (or strap top surface as viewed in FIG. 2). The strap first surface is in contact with the first panel major face 111a and the second panel major face 111b. The strap first surface generally has a smooth surface to provide continuous contact area for attachment to the first and second panel major faces.

The strap second surface 123 may include a first panel region (not seen in FIG. 2) extending lengthwise along the first panel major face 111a and along the first edge 113a. In the first panel region the strap has a thickness normal to the strap first surface that tapers with distance in the direction D1 from the first edge 113a of the first panel major face and the splice joint 106a. Similarly, the strap second surface 123 includes a second panel region 123b extending lengthwise along the second panel major face 111b along the second edge 113b. In the second panel region the strap has a thickness normal to the strap first surface that tapers with distance in the direction D2 from the second edge 113b of the second panel major face and the splice joint 106a.

A pair of splice components 103, also referred to as fittings, are mounted onto the strap and each pair of stringer flanges. For example, a first splice component 103a is positioned relative to the stringer flange 126a of the stringer 114a and relative to the first panel region 123a of the strap 120. Similarly, a second splice component 103b, a mirror image of splice component 103a, is positioned relative to the stringer flange 126b of the stringer 114a, and relative to the first panel region 123a of the strap 120. Further, a third splice component 103c, the same as splice component 103a, is positioned relative to the stringer flange 127b of the stringer 116a and relative to the second panel region 123b of the strap 120. A fourth splice component 103d, the same as splice component 103b and a mirror image of splice component 103a, is positioned relative to the stringer flange 127a of the stringer 116a and relative to the second panel region 123b of the strap 120. A pair of splice components 103 are similarly positioned relative to the flanges on each stringer 114, 116 and relative to the strap 120.

In the example shown in FIG. 2, each of the splice components 103 preferably may include a base 131 and a protrusion 133 extending transversely form the base and forming a general "L" configuration. In other examples the splice component may have other appropriate geometrical shapes. A plurality of fasteners 129 extend through the base 131 of the splice component and the underlying structures (i.e., the strap 120 and the associated panel, and/or the flange 127b and the associated panel). Corresponding fasteners attach each of the splice components 103 to the underlying structures to form a structural load path through the strap and across the splice joint 106a.

Optionally, a frame 140 may be attached to the strap 120 along the strap between longitudinally opposed splice components 103. The frame preferably has a "Z" shape and may extend circumferentially along at least a portion of the splice joint 106a between adjacent fuselage sections 104a and 104b.

Those skilled in the art will recognize that in certain conventional implementations, as a result of normal variations in manufacturing processes and tolerance stacking, contacting or facing surfaces of the two fuselage sections 104a, 104b may not be perfectly aligned. This may result in possible gaps between conventional splice components and the strap 120 and stringers 114, 116. In order to fill any such gaps, spacers or shims may be installed, which adds cost and time to the fuselage assembly process.

Figure 4:
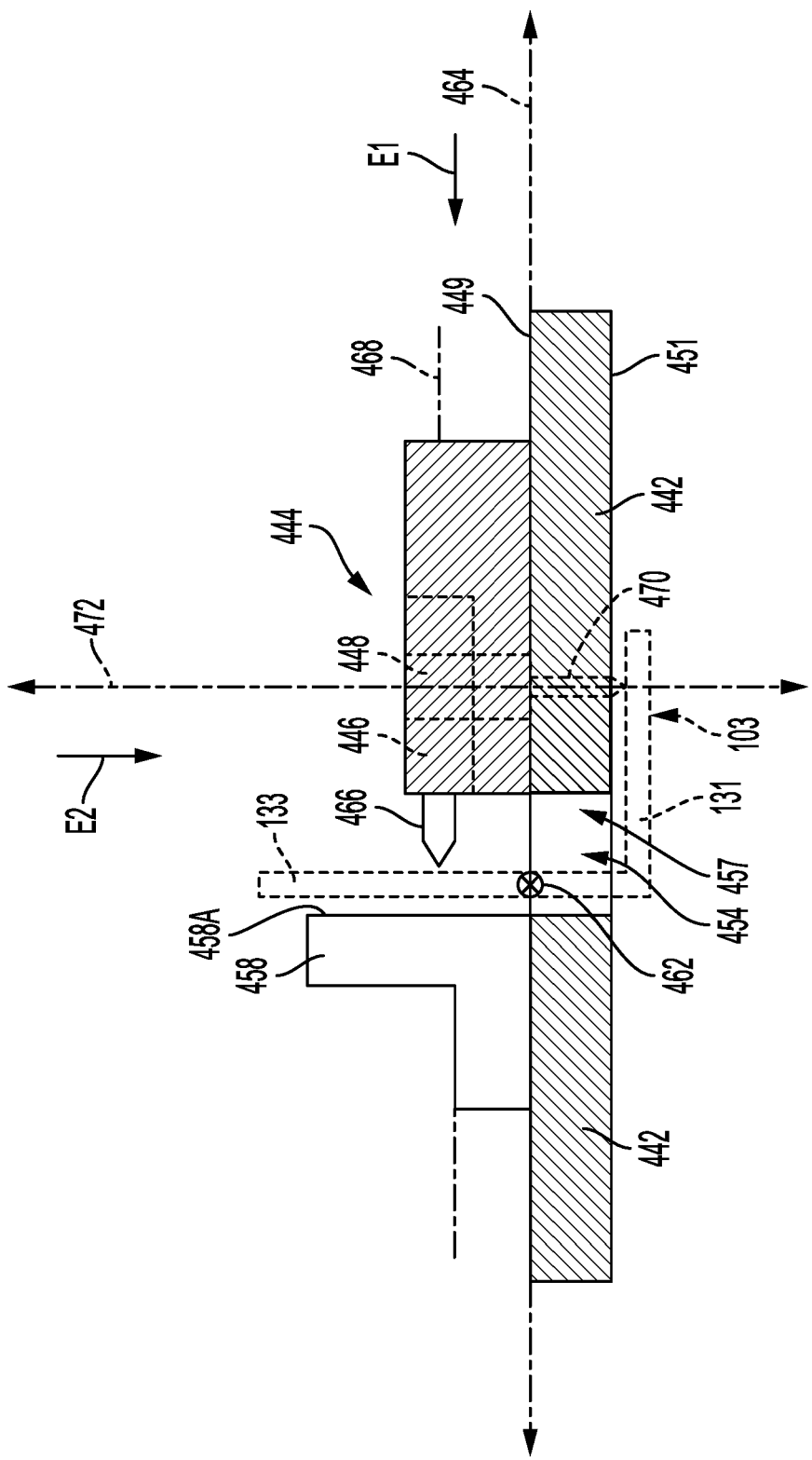
FIG. 4 is a simplified schematic of a cross sectional view of the assembly tool taken along line 4-4 of FIG. 3.

Referring now to FIGS. 3 and 4, a first example of an installation or assembly tool is shown generally at 100. As will become apparent, the assembly tool allows for a forward-aft movement of at least one splice component while supporting the splice component before and while fastening it to other elements of the splice structure. The forward-aft movement helps in eliminating or reducing a gap that might otherwise exist between contacting surfaces of the splice component 103 and the strap 120 or the associated flange of the stringers 114/116. The assembly tool can thus be used with a suitably designed splice component to reduce or eliminate the use of shims or spacers to effect a solid connection between splice elements. Additionally, in some examples the assembly tool may be configured to conform to the positions and orientations of the contacted splice-element surfaces defined by first and second fuselage sections 104a, and 104b.

FIG. 3 is a schematic isometric view of assembly tool 100. FIG. 4 is a cross sectional view of the assembly tool taken along line 4-4 of FIG. 3. In the present example, the assembly tool includes a base plate 442 and a biasing unit 444. Biasing unit 444 may include a first bias assembly 446, and a barrier element 458. In some examples, assembly tool 100, and biasing unit 444, may include a second bias assembly 448. In other examples, the assembly tool may include the base plate and one or more bias assemblies configured like first bias assembly 446. In some other examples, the assembly tool may include the base plate and one or more bias assemblies configured like second bias assembly 448.

The base plate has a first major face 449 and an opposite second major face 451. The base plate includes at least a partial opening forming a passageway 454 extending through the base plate between the first and second major faces. As shown in FIG. 3, the passageway may be closed at a first end 453 and open at an opposite second end 455. Alternatively, the passageway may be closed at both the first and second ends, thereby forming a slot or channel through the base plate. In an example as shown in FIG. 3, the passageway is preferably configured to receive the protrusion of the splice component 103, shown in dashed lines, or other splice component with an appropriate shape for splicing a pair of fuselage structures or workpieces. The shape of the passageway may be configured to complement the shape of the splice component. As mentioned before, the splice component may include the protrusion 133 extending transversely from the base 131 and the passageway may be configured to receive the protrusion with the base positioned proximate to the second major face of the base plate.

Barrier element 458 is positioned proximate to the passageway and may be part of the base plate or be supported on the base plate. In the present example, the barrier element 458 is mounted on the first major face of the base plate proximate to a first side wall 456 of the base plate forming one boundary of the passageway. The barrier element preferably is positioned relative to the passageway such that the first side wall of the base plate and a face 458A of the barrier element are coplanar or that the barrier element extends into the passageway beyond the first side wall of the base plate. In other examples, the barrier element 458 may extend all along the first side wall of the base plate or be segmented into a plurality of spaced-apart barrier elements mounted proximate to the first side wall of the base plate. Alternatively, the barrier element may not be a separate element and the first side wall of the base plate itself may function as the barrier element.

The passageway and the barrier element are configured to freely receive the protrusion 133 of the splice component 103. When the base 131 of the splice component is positioned next to and facing the second major face 451 of the base plate, the protrusion 133 of the splice component is received in the passageway proximate to a face 458A of the barrier element. The splice component is movable in the passageway along the first side wall of the base plate corresponding to a first line 462 extending orthogonal to the plane of view of FIG. 4. In this example, the first line 462 extends parallel to and along the first and second major faces 449, 451 of the base plate. Line 462 is also orthogonal to a second line 464 that also extends parallel to and along the first and second major faces 449, 451 of the base plate, but in the plane of view of FIG. 4.

The first bias assembly 446 is mounted relative to the base plate and is spaced across the passageway from the barrier element. The first bias assembly may be generally mounted proximate to a second side wall 457 opposite to the first side wall 456 of the base plate, which second side wall defines an opposing boundary of the passageway. In an example, the barrier element is directly in line with the first bias assembly. In other examples, the barrier element need not be directly in line with the first bias assembly.

The bias assemblies described herein are conventional devices that may be obtained commercially, such as a quick-release pin made by Monroe Engineering Products, LLC of Rochester Hills, Mich. Bias assembly 446 may include a first bias element 466 that extends into the passageway. The first bias element is movable resiliently along a second line 468 parallel to line 464 and the plane of view of FIG. 4. As is described in further detail with reference to FIGS. 5A and 5B, in the present example the first bias element includes a retractable spring-loaded plunger or pin that resists movement into the body of the bias assembly. Thus, when the bias element is moved toward the body of the bias assembly a tension spring in the bias assembly is compressed and urges the bias element away from the body of the bias assembly. In other examples the first bias element may include any other mechanism to resiliently move the first bias element away from the body of the bias assembly. The first bias assembly 446 is positioned so that the distal end of the bias element 466 in a relaxed state extends sufficiently far into passageway 454 that there is less space between the bias element and the barrier element 458 than a thickness of the protrusion 133 of the splice component 103.

As has been explained, the protrusion 133 of the splice component extends into the passageway between the first bias element and the barrier element when the base of the splice component is placed proximate to the second major face of the base plate. The bias element is manually retracted into the body of the bias assembly in order to provide space between the bias element and the barrier element. The protrusion of the splice component may then be inserted into the passageway in the space between the bias element and the barrier element. The bias element is then released, allowing the bias-assembly spring to press against or urge the protrusion of the splice component against the barrier element generally along line 468 in the direction E1 shown in FIG. 4. The spring of the bias assembly preferably has sufficient force that to retain the splice component in position in the assembly tool when the assembly tool is separated from any other structures. When the assembly tool is moved to a position of a splice joint with the splice component placed against two workpieces to be joined, the splice component may be moved relative to the base plate along the first line 462 while the protrusion of the splice component is urged against the barrier element.

In examples of the assembly tool 100 including a second bias assembly 448, the second bias assembly is mounted relative to the base plate proximate to second side 457 of the passageway, and proximate to the first bias assembly. The second bias assembly 448, may be the same as the first bias assembly and includes a second bias element 470 that extends past the second major face of the base plate. The second bias assembly is movable along a third line 472, that is transverse to the first direction E1 and the first line 462 and is preferably parallel to the plane of view of FIG. 4. When the base of the splice component is placed proximate to the second major face of the base plate, the protrusion of the splice component extends into the passageway and the second bias assembly is positioned and configured to urge the base of the splice component away from the base plate in a second direction shown generally at E2.

The second bias element may resist movement into the base plate. In the present example, the second bias element also includes a retractable spring-loaded plunger or pin. In other examples, the second bias assembly may include any other mechanism to resiliently urge the second bias element in direction E2 when the second bias element is moved in a direction opposite to direction E2. The second bias assembly may be configured to urge the base of the splice component away from the base plate within a limited range of motion that retains the protrusion of the splice component between the first bias element and the barrier element. When the assembly tool is moved to a position of a splice joint with the base of the splice component placed against two workpieces to be joined, the splice component may be moved relative to the base plate along the first line 462 while the second bias element urges the base of the splice component toward the workpieces to which the splice component is to be attached. It will be appreciated that the third line 472 is transverse to the first and second lines 462, 468, when viewed from view planes containing the third line that are parallel to the first line and the second line, respectively. For example, line 468 appears to be transverse (actually orthogonal in this example) to line 472 when viewed in a plane parallel to the plane of view of FIG. 4 that contains line 472. In this example, lines 468 and 472 appear to be transverse in a plane parallel to the plane of view of FIG. 4 that is parallel to both of lines 468 and 472.

In an example as shown in FIGS. 5A and 5B, a bias assembly 573, as an example of the first and/or second bias assemblies 446, 448, may include a retractable plunger, rod, or pin 575 operated by a spring-loaded plunger mechanism 574. FIG. 5A shows the plunger in a retracted position, such as would be used to load a splice-component protrusion 133 in a passageway proximate to a barrier element 458. Other forms of commercially available bias assemblies may also be used. The retractable plunger 575 includes a plunger shank 576 including a handle 577 on one end and a plunger tip 578 on the other end. The plunger shank 576 is spring biased against and is positioned within, a threaded sleeve 579. A compression spring 580 is utilized to spring bias the plunger shank and plunger toward the plunger tip 578. The plunger shank is adapted for moving axially in directions R1, shown in FIG. 5A, and R2, shown in FIG. 5B, within the threaded sleeve along a longitudinal axis A-A' of the plunger shank. The threaded sleeve 579 is in turn threadedly engaged within a threaded recess of a frame 581.

As shown in FIG. 5A, the plunger 575, as a bias element, is in a retracted position with spring 580 compressed. In other words, the plunger shank 576 is retracted in sleeve 579 along the axis A-A' in the direction R1. The spring may be compressed against an interior wall 582 of the threaded sleeve and, when the bias assembly 573 is used to bias a protrusion, the plunger tip 578 is spaced from away from the barrier element 458, allowing the protrusion 133 to be inserted in the passageway.

As shown in FIG. 5B, the bias assembly 573 is shown with the plunger 575 in the extended position. From the position shown in FIG. 5A, the plunger is released and urged by spring 580 along the longitudinal axis A-A' in a direction R2, opposite to the direction R1. In the example shown, the spring 580 expands to press the bias element, i.e., shank 575, against the protrusion 133, which in turn urges the protrusion 133 against the barrier element 458.

Figure 6A:
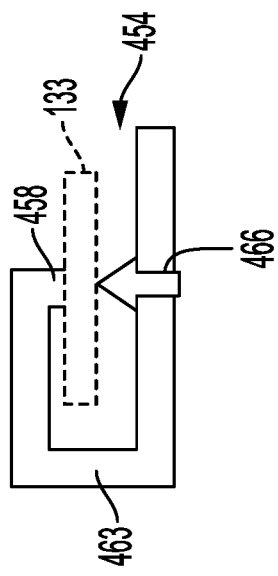
FIGS. 6A-6C are simplified plan views of different illustrative configurations of barrier elements and bias elements in biasing stations.
Figure 6C:
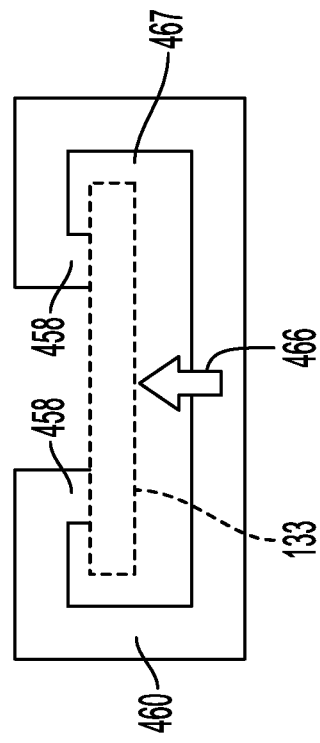
Figure 6B:
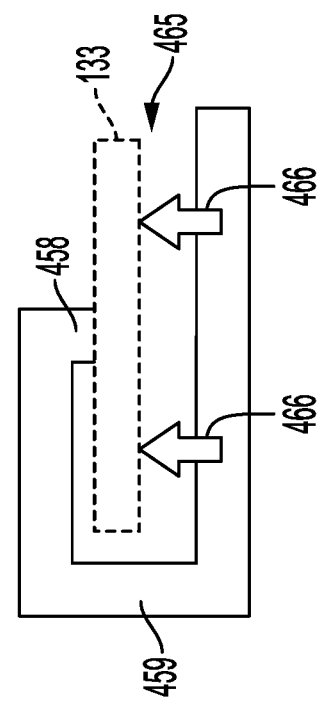

Referring to FIGS. 6A-6C, a schematic representation of different configurations of the barrier element 458 and the bias elements 466 are described. The bias element 466 in each of the arrangements is configured to urge the protrusion 133 of the splice component against the barrier element(s) 458. One or more bias elements may urge a protrusion relative to a single barrier element. Likewise, a single bias element may urge the protrusion relative to one or more barrier elements.

FIGS. 6A-6C illustrate conceptually three examples of how a protrusion of a splice component may be urged against one or more barrier elements by one or more bias assemblies. For example, as shown in FIG. 6A, a bias element 466 of a bias assembly supported relative to a base plate 463 may be collinear with the barrier element 458, also supported relative to the base plate, in order to urge the protrusion 133 of the splice component 103 in passageway 454 against the barrier element 458. This corresponds to the configuration illustrated in FIGS. 3 and 4. FIG. 6B presents an example where a pair of bias elements 466, supported relative to a base plate 459, urge the protrusion of the splice component against a single barrier element 458 disposed in the passageway 465 between the two bias elements. Alternatively, as shown in FIG. 6C, a single bias element 466, supported relative to a base plate 460, may urge the protrusion 133 of the splice component against a pair of barrier elements 458 located in opposite directions in a passageway 467 from the bias element. In the examples set forth in FIGS. 6B and 6C, the bias elements and the barrier elements are noncollinear with the indicated direction of force applied to the splice element by the bias element. It will be understood that other variations are also possible. For example, alignment in the planes of view of FIGS. 6A-6C of the points of contact of the bias element(s) and the barrier element(s) may not be required depending on the designs and interactions of the splice element and the assembly tool.

B. Illustrative Assembly Tool

As shown in FIGS. 7-12, this section describes an illustrative installation or assembly tool 700. Assembly tool 700 is an example of a tool including one or more biasing units 444 described in Example A. Accordingly, corresponding parts are correspondingly numbered in the 7XX series instead of the 4XX series. As is described below, assembly tool 700 includes a plurality of biasing units supporting, during use, each of a plurality of splice components. Assembly tool 700 is used for mounting splice components during assembly of the splice structure shown in FIG. 2. Locational and orientational aspects between two or more biasing units in the assembly tool 700 are described below.

As shown in the isometric views of FIGS. 7-10, the tool 700 includes a base plate 742 having first major face 749 and an opposite second major face 751. The first major face of the base plate extends along a first curved geometric surface P1 as shown in a top view of the tool in FIG. 8 and a front view in FIG. 10. Base plate 742 has a curvature that matches the curvature of the splice structure on which the supported splice components are mounted. This curvature approximates a section of a cylinder extending around the aircraft longitudinal axis 110. In the present example, the base plate 742 includes at least four passageways 754 (identified individually as 754*a-d*) extending through the base plate between the first and second major faces. In other examples, the base plate may include more (e.g., eight) or fewer (e.g., two) passageways.

The four passageways 754*a-d* are spaced from each other and are disposed in pairs relative to the base plate 742. The first passageway 754*a* is spaced from the second passageway 754*b*, and forms a first pair of passageways 754*a-b*. The third passageway 754*c* is spaced from the fourth passageway 754*d*, and forms the second pair of passageways 754*c-d*.

The first pair of passageways is spaced from the second pair of passageways by a middle region 742m of the base plate. The first pair of passageways 754a-b is positioned between a first side region 742a of the baseplate and the middle region 742m. The second pair of passageways are similarly positioned between a second side region 742b of the baseplate and the middle region 742m. The first side, second side and middle regions of the base plate 742 include a plurality of holes 742h extending through the base plate. The holes may receive fastener elements for holding the base plate on the splice structure during installation of the splice components on respective pairs of workpieces or fuselage sections.

Figure 7:
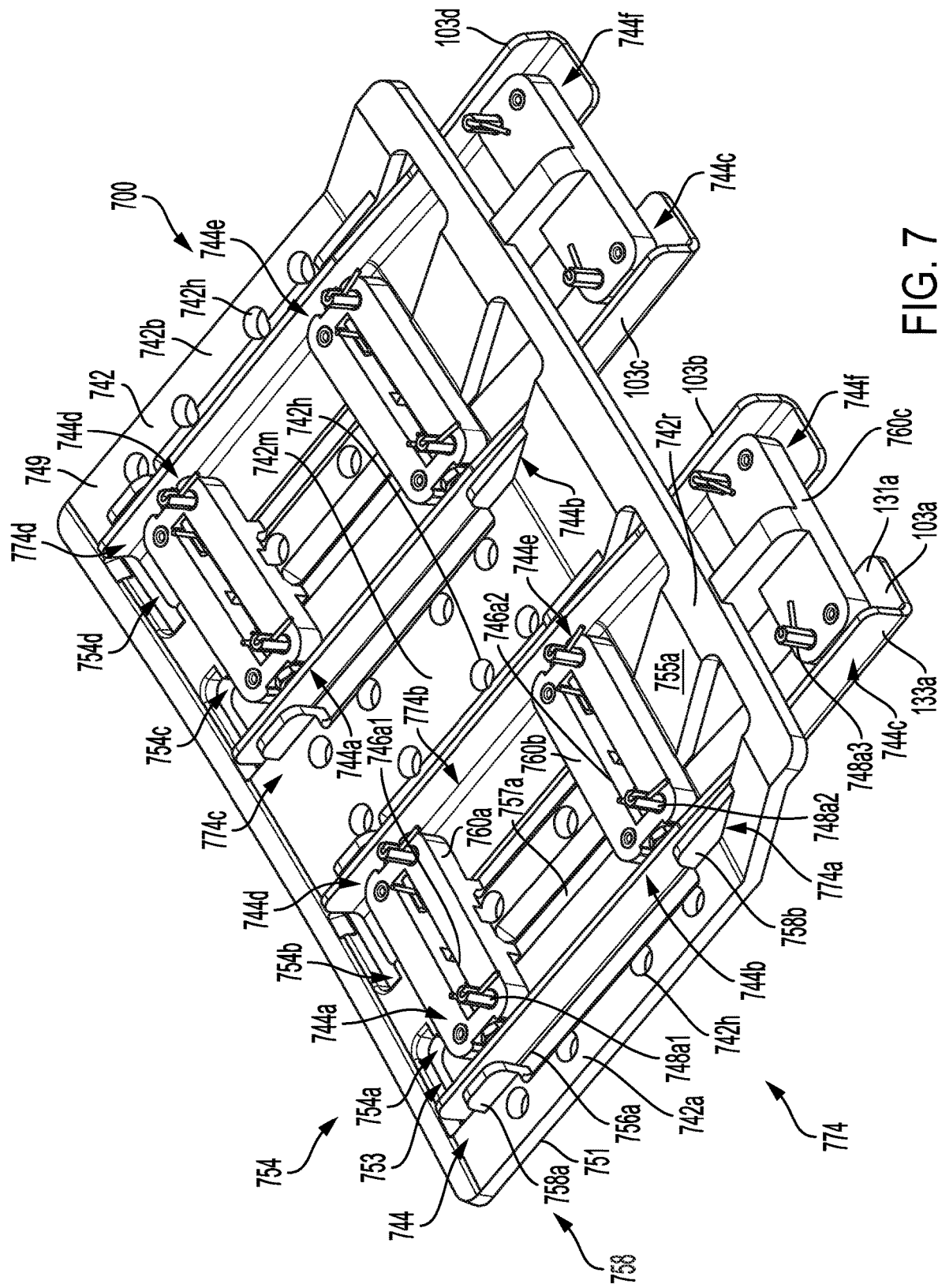
FIG. 7 is an isometric view of an example of an assembly tool.
Figure 8:
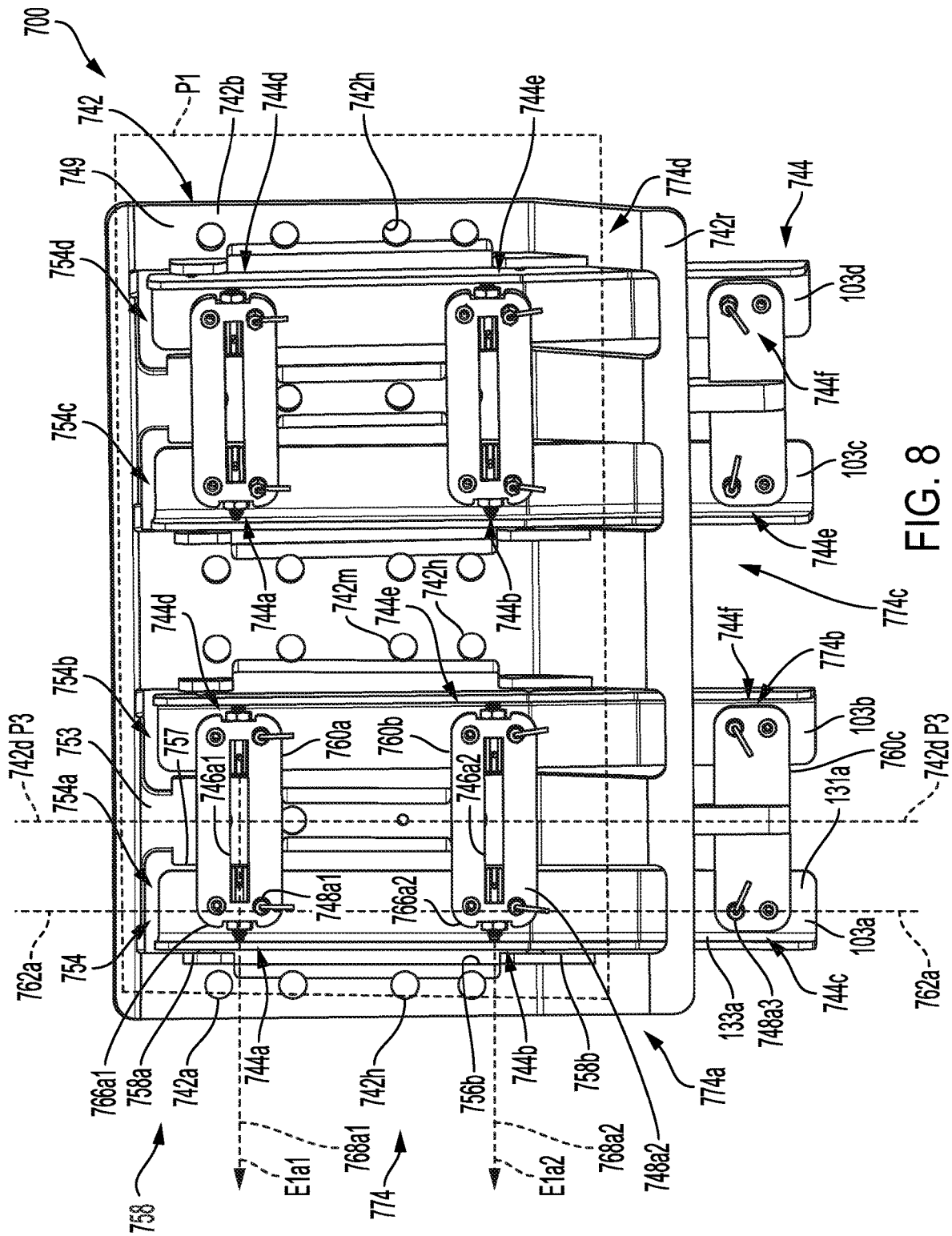
FIG. 8 is a top view of the assembly tool of FIG. 7.
Figure 10:
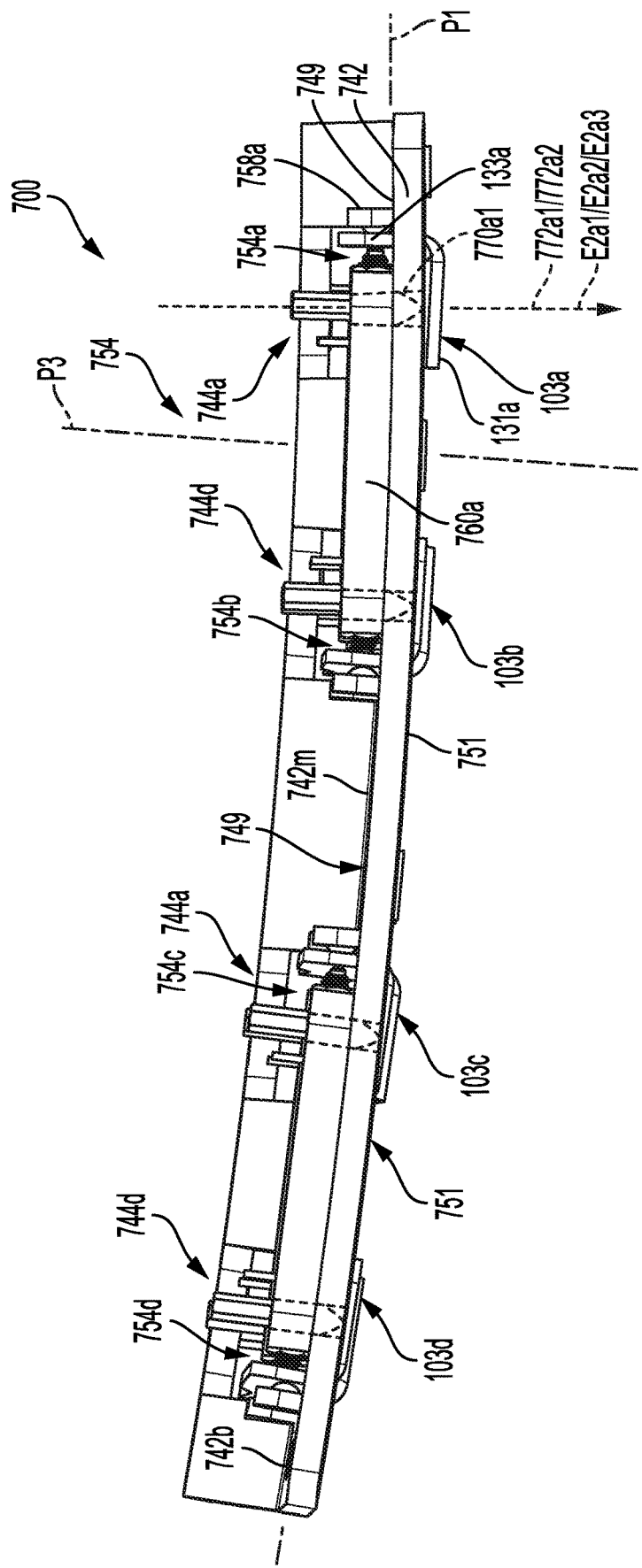
FIG. 10 is a front view of the assembly tool of FIG. 7.

As shown in FIGS. 7 and 8, the first and second pairs of passageways and biasing units mounted relative to the passageways are arranged the same but spaced apart on base plate 742, and also are mirror images of each other about the middle of the base plate. Further, the first and the second passageways and components mounted relative to the passageways are arranged in a mirror image relationship relative to a plane P3 disposed orthogonal to the curved geometric surface P1 extending along the first major face of the base plate. The plane P3 is also shown in FIG. 10. Accordingly, the detailed description below is described in reference to the first passageway 754a and components arranged relative to the first passageway 754a. Likewise, components arranged relative to second, third, and fourth passageways, 754b-d may have substantially similar descriptions.

Figure 11:
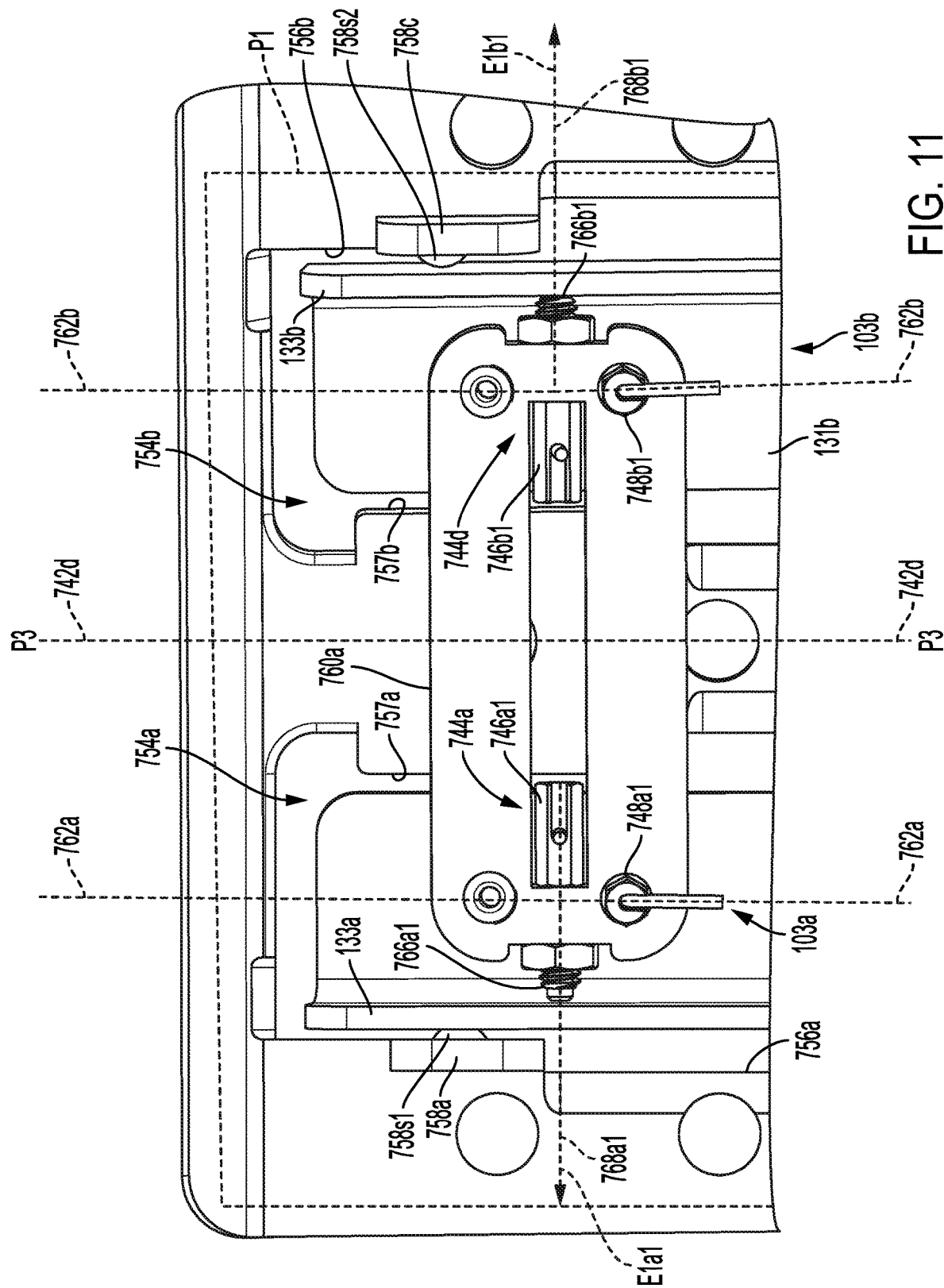
FIG. 11 is a top view of a portion of the assembly tool of FIG. 7.
Figure 12:
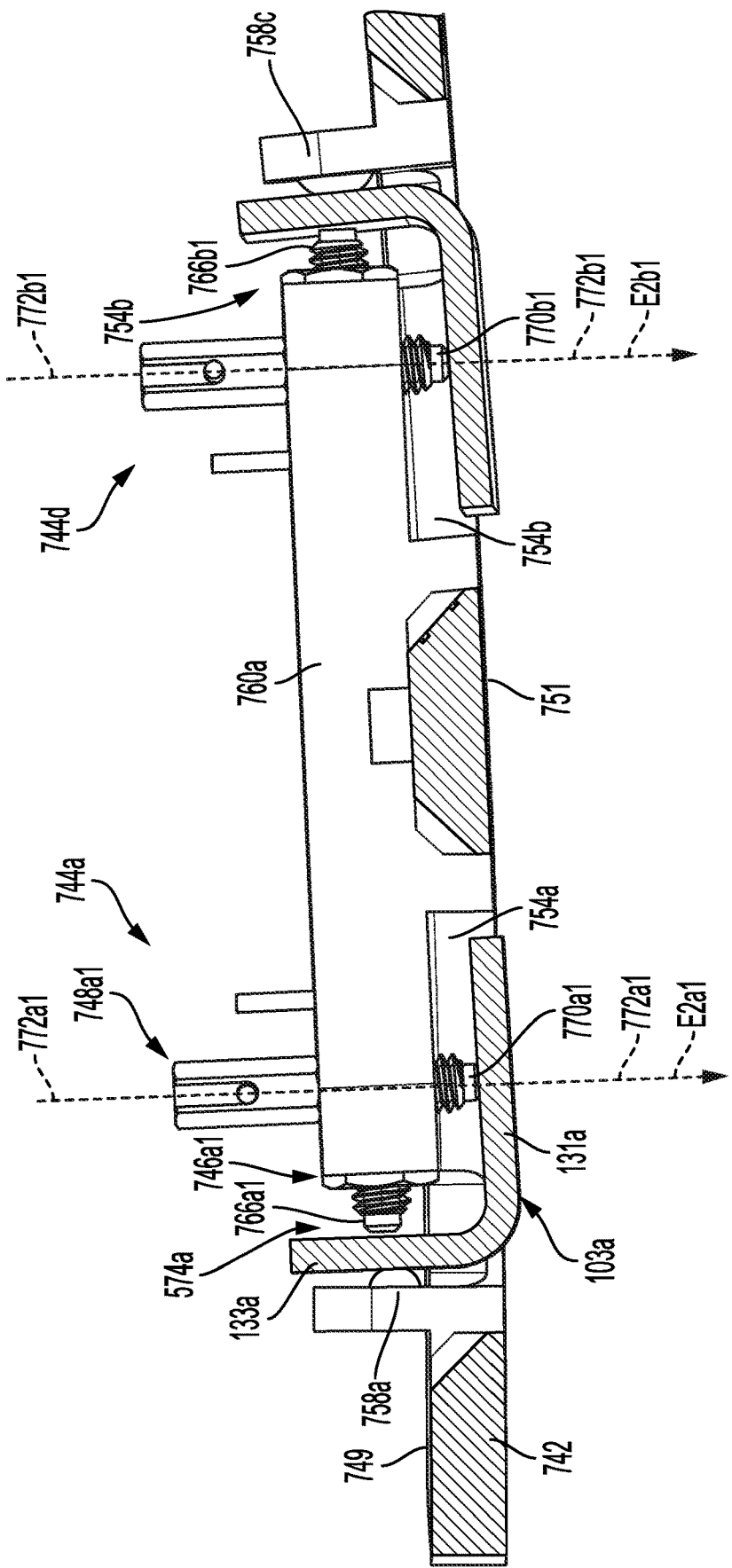
FIG. 12 is a front view of the portion of the assembly tool of FIG. 11.

Biasing tool 700 includes biasing stations 774 associated with passageways 754 for supporting splice components 103 relative to the biasing tool. Specifically, biasing stations 774a-d associated with passageways 754a-d, respectively, support respective splice components 103a-d. Each biasing station 774 includes three biasing units 744. Biasing stations 774a and 774c are the same and each includes biasing units 744a-c. Similarly, biasing stations 774b and 774d are the same and each includes biasing units 744d-f. Additionally, in this example, biasing station 774b is a mirror image of biasing station 774a. Accordingly, the following description of biasing station 774a applies as well to the other biasing stations. Detailed views of biasing units 744a and 744d are shown in FIGS. 11 and 12.

As shown, the first passageway 754a is closed at a first end 753a and open at an opposite second end 755a of the base plate. End 755a bends away from geometric surface P1 and the opening in the base plate forming passageway 754a at geometric surface P1 also extends away from geometric surface P1, producing the open end in the passageway. The passageway may be configured to receive the first splice component 103a or any other splice component of appropriate geometrical shape for joining a pair of fuselage structural parts or workpieces.

Biasing units 744a-b each include a barrier element 758 mounted proximate to passageway 754a. Specifically, a first barrier element 758a is mounted near base-plate end 753 is mounted on the base plate proximate to a side wall 756a defining the passageway 754a. A second barrier element 758b, spaced along the passageway from first barrier element 758a, is mounted on the base plate near base-plate end 755a. In other examples, a barrier element 758 may extend along an extended length of the passageway. Alternatively, the side wall of the passageway may function as the barrier element.

Figure 9:
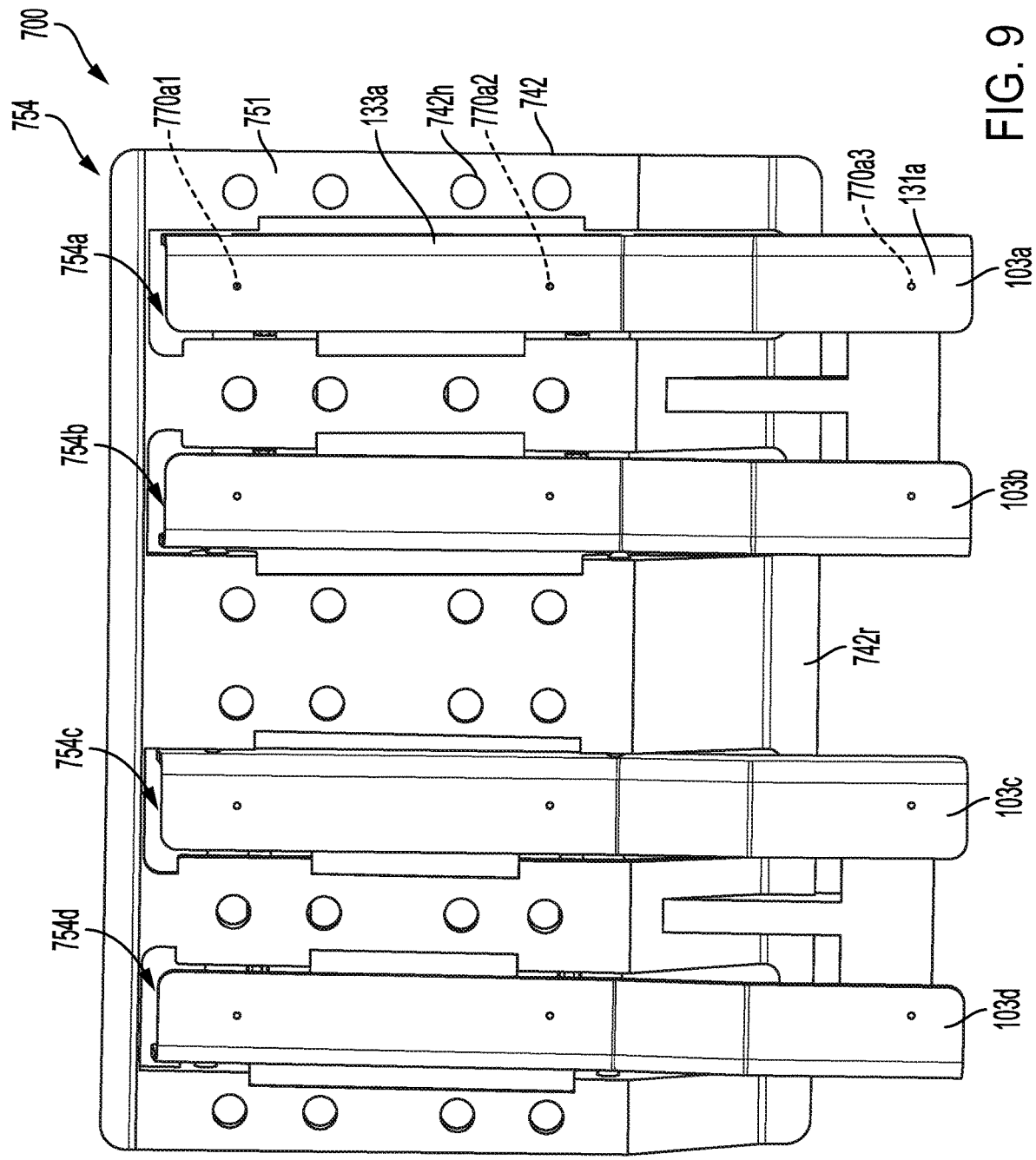
FIG. 9 is a bottom view of the assembly tool of FIG. 7.

For example, as shown in the top view of FIG. 8 and the bottom view of FIG. 9, during use of assembly tool 700, the base 131a of the first splice component 103a may be positioned next to and facing the second major face 751 of the base plate 742. Then, the protrusion 133a of the splice component 103a is freely received in the passageway 754a proximate to the barrier elements 758a, 758b. The splice component 103a is movable relative to base plate 742 along a first line 762a extending along the first major face 749 of the base plate.

In the present example, biasing units 744a and 744b are spaced apart from each other and are mounted on the first major face of the base plate proximate to a second side wall 757 of the first passageway 754a. The first biasing unit 744a includes a first bias assembly 746a1 and a second bias assembly 748a1. Likewise, the second biasing unit 744b includes a third biasing assembly 746a2 (substantially similar to the first bias assembly 746a1) and fourth biasing assembly 748a2 (substantially similar to the second bias assembly 748a1).

The biasing assemblies of biasing units 744a and 744d are mounted in mirror image configurations on a mounting plate 760a mounted on the first major surface 749 of the base plate. Similarly, the biasing assemblies of biasing units 744b and 744e are mounted in mirror image configurations on a mounting plate 760b. Additionally, the biasing assemblies of biasing units 744c and 744f are mounted in mirror image configurations on a mounting plate 760c. The mounting plates extend over the passageway in the base plate, thereby reducing the size of the passageway into which the splice-component protrusion is placed.

The first and third bias assemblies 746a1, 746a2 are mounted relative to the base plate 742 and are spaced from the barrier elements 758a, 758b. The first and third bias assemblies may be generally mounted proximate to a second side 757a opposite to the first side 756a of the passageway 754a. In the present example the first and third bias assemblies are not in line with either of the barrier elements 758a, 758b. Rather, the bias assemblies 746a1, 746a2 are positioned along the passageway between the two barrier elements. In other examples the first and third bias assemblies may be mounted in line with the respective barrier elements 758a, 758b.

The first and third bias assemblies include first and third bias elements 766a1, 766a2 that extend proximate to the first passageway 754a. The first bias element applies a force in a first direction E1a1 when it is moved along a second line 768a1 opposite to the direction E1a1, which extends along the first major face of the base plate. Similarly, the third bias element applies a force in a third direction E1a2 when moved along a second line 768a2 in a direction reverse to direction E1a2. The third direction E1a2 is at least partially aligned with, and is preferably parallel to, the first direction E1a1. The first and third directions are transverse (i.e., orthogonal) to the first line 762a. The first and third bias assemblies may be configured to urge the protrusion 133a of the splice component 103a against the barrier elements 758a, 758b.

The first and third bias elements 766a1, 766a2 are resiliently moved in a direction opposite to the first and third directions E1a1, E1a2 respectively, to provide space to insert the protrusion of the splice component. The passageway, the barrier element, and the first and third bias assemblies are configured to allow movement of the splice component 103a relative to the base plate along the first line 762a while the bias elements are forcing the splice-component protrusion against the respective barrier elements.

The second and fourth bias assemblies 748a1, 748a2 are mounted relative to the base plate and are spaced from the barrier elements 758a, 758b. The second and fourth bias assemblies may be generally mounted proximate to second side 757a of the first passageway 754a proximate to the first and third bias assemblies respectively.

As shown in the front view of FIG. 10, the second bias assembly 748a1 includes a second bias element 770a1 that extends past the second major face 751 of the base plate. The second bias element is resiliently movable in a second direction E2a1 along a third line 772a1 extending transverse to the curved geometric surface P1 extending along the first major face of the base plate. Similarly, the fourth bias assembly includes a fourth bias element 770a2 that extends into the passageway of the base plate in a direction away from the first major face of the base plate. The fourth bias element is movable resiliently in a fourth direction E2a2 along a third line 772a2 extending transverse to the geometric surface P1. Mounting plate 760a extends over the passageway in the base plate, thereby reducing the width of the passageway into which the splice-component protrusion is placed. When the splice-component base is in contact with the second and fourth bias elements, the splice-component base extends beyond the second major surface of the base plate, The second direction at least is partially aligned with, and is preferably parallel to, the fourth direction. The second and fourth directions are transverse to the first direction and the first line 762a. The third lines 772a1, 772a2 are transverse to the first line 762a and the second lines 768a1, 768a2, when viewed from view planes containing the third lines 772a1, 772a2, and that are parallel to the first line 762a and the second lines 768a1, 768a2, respectively.

As can be seen in FIGS. 10 and 12, when the base 131a of the splice component 103a is placed proximate to the second major face 751 of the base plate 742, the protrusion 133a of the splice component 103a extends into the first passageway 754a, and the second and fourth bias assemblies are configured to urge the base 131a of the splice component away from the base plate 742.

When the second and fourth bias elements 770a1, 770a2 are resiliently moved in a direction opposite to the second and fourth directions E2a1, E2a2, respectively, the second and fourth bias elements apply forces to splice-component base 131a in directions E2a1, E2a2. With the splice component supported in this position, the configuration of the passageway, the barrier element, and the second and fourth bias assemblies allows movement of the splice component 103a relative to the base plate along the first line 762a.

The passageway 754a, the barrier elements 758a, 758b, and the first and second biasing units 744a, 744b including the first, second, third, and fourth biasing assemblies are configured to allow movement of the base 131 of the first splice component 103 along passageway transverse to the first, second, third, and fourth directions. The first, second, third and fourth bias assemblies form and define a first biasing station 774 for supporting the first splice component relative to the base plate.

Referring to FIGS. 7 and 8, a third biasing unit 744c is mounted relative to the base plate spaced along the first line 762a from the first and second biasing assemblies. The third biasing unit 744c includes a fifth bias assembly 748a3. The fifth biasing assembly is substantially similar to the second or fourth bias assemblies described above. The fifth bias assembly 748a3 includes a fifth bias element 770a3 that extends past the second major face of the base plate 742, and is movable resiliently in a fifth direction E2a3. The fifth direction E2a3 is at least partially aligned with the second and fourth directions E2a1, E2a2. Also, the fifth direction is transverse to the first and third directions. The fifth bias assembly is configured to urge the splice-component base away from the base plate similar to the second and fourth bias assemblies.

When the fifth bias element 770a3 is resiliently moved in a direction opposite to the fifth direction E2a3, the configuration of the passageway, the barrier element, and the fifth bias assembly allow movement of the splice component 103a relative to the base plate along the first line 762a.

As seen in FIG. 7, the base plate extends as a raised portion 742r between the second and third biasing units 744b, 744c. The third biasing unit 744c is supported relative to the base plate at a position spaced beyond the first passageway as shown in FIG. 7 by mounting plate 760c.

As mentioned with reference to first and second panel major faces 111a, 111b described above with reference to FIG. 2, the first and second panel major faces 111a, 111b define panel concave surfaces. The first and second edges 113a, 113b extend about the circumference of the fuselage structure splice. The strap 120 including the strap second surface 123 defines a corresponding strap concave surface. In an example, as can be seen in a front view of the assembly tool 700 as shown in FIG. 10, the curves of the first and second major faces of the base plate along curved geometric surface P1 complements the strap concave surface and the curving of the panel major faces.

Referring to a portion of the tool 700 including the biasing units 744a, 744d disposed along the first and second passageways 754a, 754b, is as shown enlarged in a top view in FIG. 11 and a front view in FIG. 12. As mentioned before with reference to FIGS. 7, 8, the first and second passageways and components are arranged in a mirror image relationship relative to a plane P3 shown in FIG. 10. Plane P3 is orthogonal to the curved geometric surface P1' extending along the first major face of the base plate. The plane P3 is represented by a longitudinal line 742d extending midway between the first and second passageway as shown in FIGS. 8 and 11. Accordingly, the barrier element 758a mounted relative to the first passageway 754a and the barrier element 758c mounted relative to the second passageway 754b are in mirror image relationship to each other. Likewise, the biasing units 744a, 744d are in mirror image relationship to each other.

The description for the biasing unit 744a is as described above. The biasing unit 744d includes a sixth bias assembly 746b1 (substantially similar to first biasing assembly 746a1) and a seventh bias assembly 748b1 (substantially similar to second biasing assembly 748a1). The second passageway and the barrier element 758c are configured to freely receive a second protrusion 133b of a second splice component 103b. The splice component 103b is movable along a first line 762b extending along curved geometric surface P1 extending along the first major face 749 of the base plate. The first lines 762a, 762b are parallel to each other.

The sixth bias assembly 746b1 is mounted on mounting plate 760a relative to the base plate 742 and is spaced from the barrier element 758c. The sixth bias assembly may be generally mounted proximate to a second side 757b of the passageway 754b opposite to the first side 756b. In the present example the sixth bias assembly is not in line with the barrier elements 758c. In other examples the first and third bias assemblies may be mounted in line with the barrier elements 758c.

The sixth bias assembly includes a sixth bias element 766b1 that extends proximate to the second passageway 754b. The sixth bias element applies a force in a sixth direction E1b1 when the bias element is moved along a second line 768b1 in a direction opposite to direction E1b1.

The sixth direction E1b1 is at least partially aligned with the first direction E1a1. The sixth direction is opposite to the first direction and the sixth line 768b1 is collinear with the first line 768a1. The sixth direction is transverse to the first lines 762a, 762b. The first and sixth bias assembly may be configured to urge the protrusion of the respective splice components 103a, 103b against the respective barrier elements 758a, 758c. In some examples the barrier elements 758a, 758c may have a support fixture 758s1, 758s2 fastened to their respective faces interfacing the protrusion of the splice components.

The first and sixth bias elements 766a1, 766b1 are resiliently moved in an opposite direction to the first and sixth directions E1a1, E1b1 respectively. Then, the first and second passageways 754a, 754b, the barrier elements 758a, 758c, and the first and sixth bias assemblies are configured to allow movement of the respective splice components 103a, 103b relative to the base plate along the first line and sixth lines 762a, 762b, respectively.

The seventh bias assembly is also mounted relative to the base plate on mounting plate 760a and is spaced from the barrier element 758c. The seventh bias assembly may be generally mounted proximate to a second side 757b of the second passageway and proximate to the sixth bias assembly. The seventh bias assembly includes a seventh bias element 770b1 that extends past the lower surface of mounting plate 760a, as viewed in FIG. 12. The seventh bias element is movable resiliently in a seventh direction E2b1 along a seventh line 772b1 extending transverse to the curved geometric surface P1. Mounting plate 760a extends over the passageway in the base plate, thereby reducing the width of the passageway into which the splice-component protrusion is placed. When the splice-component base is in contact with the seventh bias element, the splice-component base extends beyond the second major surface of the base plate The second direction is at least partially aligned with the seventh direction. The second and seventh directions are transverse to the first direction and to the first lines 762a, 762b. The third lines 772a1, 772b1 are transverse to the first and second lines 762a, 762b, 768a1, and 768a2, when viewed from view planes containing the third lines 772a1, 772a2 that are parallel to the first lines 762a, 762b and the second lines 768a1, 768b1 respectively.

Referring back to FIGS. 7-10 and as discussed previously, the tool 700 includes a plurality of biasing stations including the first, second, third and fourth biasing stations 774a-d. Each biasing station of the plurality of biasing stations is configured to support a respective one of splice components 103a-d with a respective one of protrusions 133a-d in the associated one of passageways 754a-d relative to the base plate 742. In the present example the assembly tool includes twelve biasing units 774 including eight first bias assemblies 746a1-d2, and twelve second bias assemblies 748a1-d3, for a total of twenty bias assemblies. The base plate, barrier elements, and mounting plates of the assembly tool may be made of a single unitary structure or be made as separate components rigidly attached together.

Figure 13:
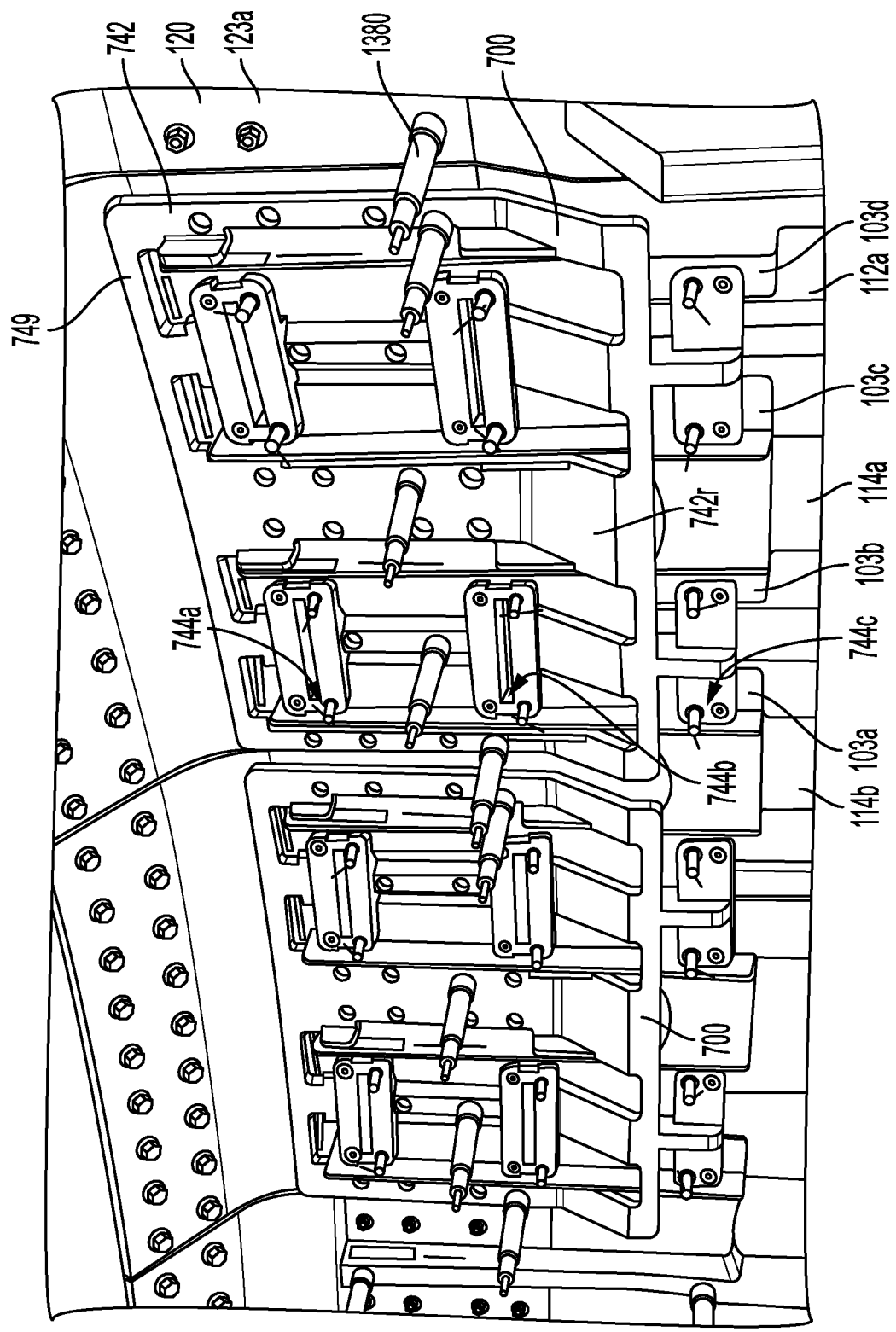
FIG. 13 is a perspective view showing the use of the assembly tool of FIG. 7 during installation of a fuselage joint splice.

As depicted in FIG. 13, the assembly tool 700 may be used for installing the splice components 103 relative to the flanges of the stringers 114 or 116 and the strap 120 for splicing a pair of fuselage panel sections 112a, 112b as mentioned in reference to FIG. 2.

In the present example, after loading assembly tool 700 with splice components 103a-d as illustrated in FIGS. 7-12, the assembly tool is preferably positioned such that the raised portion 742r of the base plate 742 extends over the ends of the stringers 114 or 116 and away from the strap 120. The tool 700 as illustrated may support up to four splice components, including one or more of first, second, third and fourth splice components 103a-d, in their respective passageways 754a-d, as shown in FIGS. 7-12. Each of the splice components 103a-d may be installed on the splice structure relative to the stringer flanges attached to the first panel portion 112a and the strap 120. In an example, the tool is configured to support the splice components in spaced relationship appropriate to align the first and second splice components 103a, 103b with a pair of adjacent flanges of adjacent stringer, such as stringers 114a, 114b shown in FIG. 13. The second and third splice components 103b, 103c are similarly relatively supported to align them for attachment to a pair of flanges of a common stringer, such as stringer 114a.

Prior to attachment of the splice components to the strap and the respective stringer flanges, the assembly tool is preferably fastened to the strap 120 with a plurality of temporary fasteners 1380, such as Cleco fasteners made by U.S. Industrial Tool & Supply Company of Gardena, Calif., using holes 742h in the base plate. For example, with the tool fastened to the strap 120, each of the splice components 103a-d can be moved independently to different positions in forward-aft directions extending along the first major face 749 of the base plate 742, as discussed with reference to FIGS. 8 and 11. The forward and aft direction movements of the splice components 103a-d may be facilitated by manipulating the biasing assemblies 746a1-a2, 748a1-a3 mounted relative to each of the passageways as mentioned before in reference to FIGS. 7-12. Each of the supported splice components are positioned so that the contact surfaces are aligned with and make continuous contact with the strap 120 and the respective flanges of the stringers. The splice components 103a-d are then attached to the strap and stringer flanges by drilling and milling holes for the permanent fasteners in the splice component, strap and stringer flanges. The temporary fasteners 1380 may then be removed and the tool 700 removed from the splice components 103a-d, leaving a completed splice structure as shown in FIG. 2.

It can be seen that the raised portion 742r of the base plate of the assembly tool keeps the base plate from contacting the raised portion of stringers 114 or 116. The portion of the base plate extending along curved geometric surface P1, as shown in FIG. 10, is positioned over the strap 120. This allows for the portion of the base plate over the strap to be oriented at a different angle relative to the underlying panel surface than that of the stringer flanges. As noted with reference to FIG. 2, the strap surface 123a to which the splice components are attached is tapered, and the splice components have a corresponding bend that aligns the mounting surfaces of the splice components with the differently angled strap and stringer flange surfaces.

It will be appreciated, then, that the biasing units 744c and 744f mounted on mounting plate 760c are positioned away from the base plate and over the stringer flanges during installation. The associated biasing assemblies urge the associated ends of the bases of the splice components towards the underlying stringer flanges. These "outboard" biasing assemblies, without the biasing assemblies supporting the splice-component protrusions, allow the protrusion of the supported splice components to be placed adjacent to the raised portions of the stringers.

As seen in FIG. 13, plurality of assembly tools 700 may be positioned adjacent to each other to install splice components relative to a plurality of adjacent stringers as shown in FIG. 13. Each of the tools can be used to install four splice components, thus avoiding tedious individual installation of splice components. Other configurations of assembly tools may support more or fewer splice components. Additionally, with the use of multiple assembly tools, the drilling of fastener holes in the splice components and associated strap and stringer flanges, and installation of fasteners, may be automated.

C. Illustrative Method of Installing a Splice Component

Figure 14:
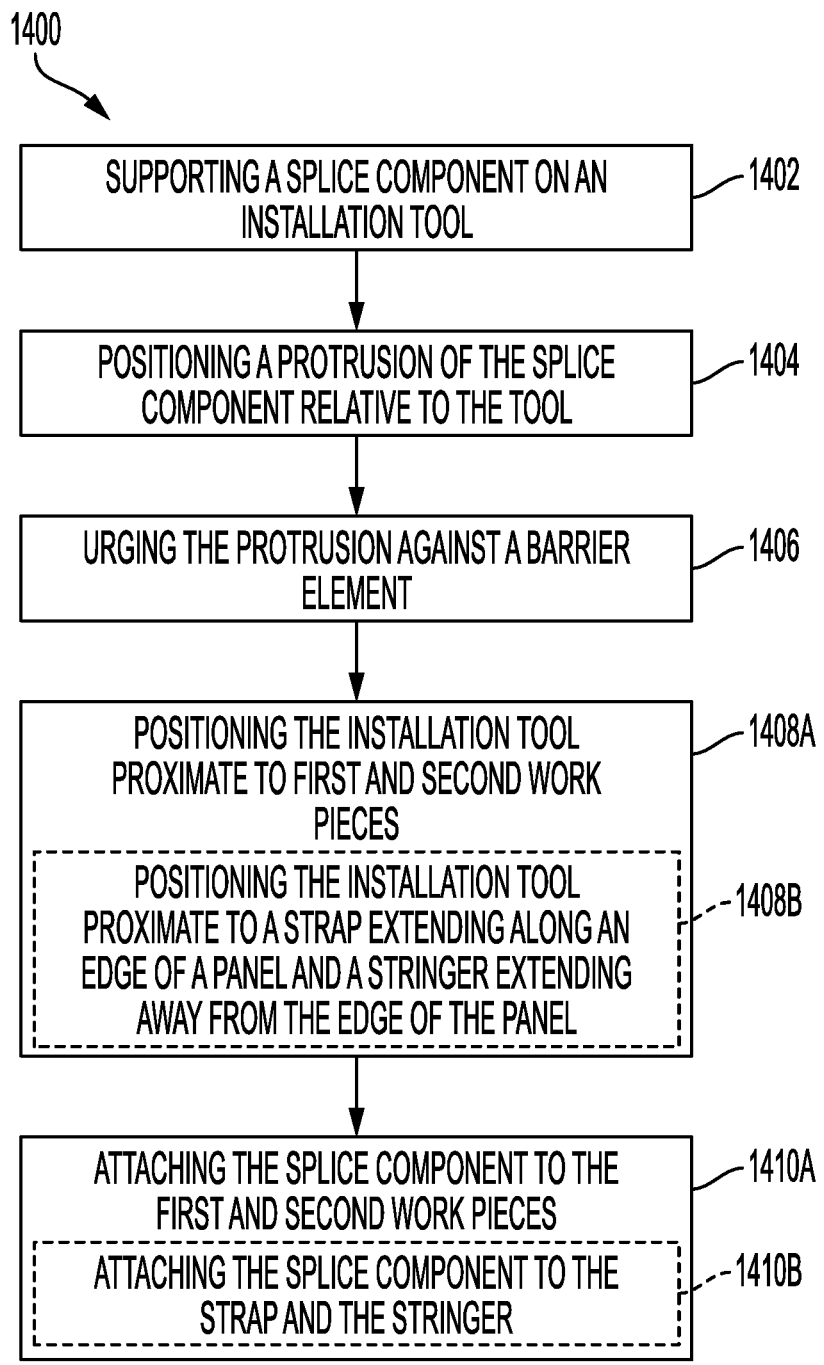
FIG. 14 is a flow chart depicting steps of an example of a method for installing a splice component on workpieces of a splice using an assembly tool.

This section describes steps of an illustrative method 1400 for installing at least a first splice component for splicing at least a pair of work pieces or fuselage splice structure components; see FIG. 14. Aspects of an assembly tool including base plate, barrier elements, bias assemblies, as well as fuselage splice structure components, splice components, stringers, straps, and/or any fuselage components described previously may be utilized in the method steps described below. Where appropriate, reference may be made to components and systems that may be used in carrying out each step. These references are for illustration, and are not intended to limit the possible ways of carrying out any particular step of the method.

FIG. 14 is a flowchart illustrating steps performed in an illustrative method, and may not recite the complete process or all steps of other processes including the illustrated method. Although various steps of method 1400 are described below and depicted in FIG. 14, the steps need not necessarily all be performed, and in some cases may be performed simultaneously or in a different order than the order shown.

A step 1402 includes supporting a splice component 103a on an installation tool, such as assembly tool 700 (or 100), having a base plate 742 with first and second major faces 749, 751, as shown in FIGS. 7-12.

A step 1404 includes positioning a protrusion 133a of the splice component 103a in a first passageway 754a extending through the base plate 742. Further, the protrusion 133a is positioned between a first bias element 766a1 of a first biasing assembly 746a1 mounted relative to the base plate 742 and a first barrier element 758 mounted relative to the base plate 742 proximate to the first passageway 754a.

A step 1406 includes urging the first protrusion 133a against the first barrier element 758. The first bias element 766a1 is resiliently urged against the first protrusion 133a in a first direction E1a1 extending along the first major face 749.

In an example, the installation tool with the splice component may be utilized for joining a pair of work pieces. In other examples, the installation tool with the splice component may be utilized for joining two fuselage sections. A step 1408A includes positioning the installation tool 700 while supporting the splice component 103a with the splice component proximate to a first and second workpiece. In an example of step 1408A, a step 1408B includes positioning the installation tool 700 while supporting the splice component 103a with the splice component proximate to the strap 120 extending along the edge of a panel 113a and the stringer 114 extending away from the edge of the panel 113a.

In some examples step 1408A, further includes moving the splice component 103a relative to the base plate 742 along a first line 762a transverse to the first direction E1a1. Further, the tool 700 may be fastened to at least the first workpiece with a set of fastening elements 1380. In some other examples step 1408A further includes moving the splice component 103a relative to the base plate 742 along a first line 762a transverse to the first direction. Further in step 1408B, the tool may be fastened to at least the strap 120 with a set of fastening elements 1380.

In other examples, step 1408A further includes urging a first base 131a of the splice component 103a toward at least one workpiece of the first and second workpieces. A second bias element 766a2 of a second biasing assembly 746a2 is mounted relative to the base plate 742. The second bias element 766a2 is resiliently urged against the first base 131a of the splice component in a second direction E2a1 toward the at least one workpiece. In yet other examples step 1408B, further includes urging a first base 131a of the splice component 103a toward at least the strap 120. The second bias element 466a is resiliently urged against the first base 131a of the splice component 103a in a second direction E2a1 toward at least the strap 120.

In some other examples, step 1408A (or 1408B) further includes positioning the first protrusion 133a between a third bias element 766a2 of a third biasing assembly 746a2 mounted relative to the base plate 742 and spaced along the first passageway 754a from the first biasing assembly 746a1, and a second barrier element 758b mounted relative to the base plate 742 proximate to the first passageway 754a. The first protrusion 133a is urged against the second barrier element 758b by resiliently urging the third bias element 766a2 against the first protrusion 133a in a third direction E1a2 extending along the first major face. The step 1408A may include urging the first base of the splice component toward the at least one workpiece by resiliently urging a fourth bias element 772a2 of a fourth biasing assembly in a fourth direction away from the second major face of the base plate and toward the at least one workpiece.

The first, second, third and fourth bias assemblies 746a1, 748a1, 746a2, 748a2 together form a first biasing station 774 for supporting the splice component 103a relative to the base plate 742. The installation tool includes a plurality of biasing stations including the first biasing station. The step 1408A may include supporting a plurality of splice components 103a-d by the plurality of biasing stations 774. Each biasing station 774 of the plurality of biasing stations is configured to support a respective protrusion 133a-d of a respective splice component 103a-d in a respective passageway 754a-d relative to the base plate 742.

A step 1410A includes attaching the splice component 103a to the first and second workpieces. In some examples, step 1410A includes a step 1410B of attaching the splice component to the strap 120 and the stringer flanges 126, 127. In some examples step 1410A further includes removing the set of fastening elements and removing the tool 700 from the splice component 103a.

In some examples, the method 1400 further includes supporting a second splice component 103b on the installation tool 700. A second protrusion 133b of the second splice component 103b is positioned in a second passageway 754b spaced from the first passageway. The second passageway 754b extends through the base plate 742. The second protrusion 133b is positioned between a second bias element 766b1 of a second biasing assembly 746b1 mounted relative to the base plate and a second barrier element 758c mounted to the base plate proximate to the second passageway 754b. The second protrusion 133b is urged against the second barrier element 754b. The second bias element 766b1 is resiliently urged against the second protrusion 133b in a second direction E1b1. The second direction is at least partially aligned with the first direction E1a1 and extends along the first major face 749. Further, the installation tool 700 may be positioned with the second splice component 103b proximate to third and fourth workpieces, while supporting the second splice component 103*b*. Then, the second splice component 103*b* is attached to the third and fourth workpieces.

Illustrative Combinations and Additional Examples

This section describes additional aspects and features of an installation or assembly tool for fuselage structure splice, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. An apparatus for mounting at least a first splice component for joining two workpieces comprising:
a base plate having opposite first and second major faces, a first passageway extending through the base plate, and a first barrier element mounted proximate to the first passageway, wherein the first passageway and the first barrier element are configured to freely receive a first protrusion of the first splice component; and
a first bias assembly mounted relative to the base plate, wherein the first bias assembly includes a first bias element that extends proximate to the first passageway and is configured to move resiliently in a first direction extending along the first major face to urge the first protrusion against the first barrier element;
wherein the first passageway, the first barrier element, and the first bias assembly are configured to allow movement of the first splice component relative to the base plate transverse to the first direction.

A2. The apparatus of paragraph A1, where a first base of the first splice component extends along the second major face when the first protrusion extends into the first passageway, and the apparatus further comprises a second bias assembly mounted relative to the base plate, wherein the second bias assembly includes a second bias element that extends past the second major face of the base plate in a second direction that is transverse to the first direction, and the second bias assembly is configured to urge the first base away from the base plate.

A3. The apparatus of paragraph A2, wherein the first passageway, the first barrier element, and the first bias assembly are configured to allow movement of the first protrusion along the first major face.

A4. The apparatus of paragraph A2, further comprising:
a third bias assembly mounted relative to the base plate spaced from the first bias assembly, wherein the third bias assembly includes a third bias element that extends into the first passageway, is configured to move resiliently in a third direction at least partially aligned with the first direction and extending along the first major face, and the third bias assembly is configured to urge the first protrusion against the first barrier element; and
a fourth bias assembly mounted relative to the base plate spaced from the second bias assembly, wherein the fourth bias assembly includes a fourth bias element that extends past the second major face of the base plate in a fourth direction at least partially aligned with the second direction and that is transverse to the first and third directions, and the fourth bias assembly is configured to urge the first base away from the base plate;
wherein the first passageway, the first barrier element, and the first, second, third, and fourth bias assemblies are configured to allow movement of the first base along the second major face transverse to the first, second, third, and fourth directions.

A5. The apparatus of paragraph A4, further comprising a fifth bias assembly mounted relative to the base plate spaced along the first line from the second and fourth bias assemblies, wherein the fifth bias assembly includes a fifth bias element that extends past the second major face of the base plate in a fifth direction at least partially aligned with the second and fourth directions and that is transverse to the first and third directions, and the fifth bias assembly is configured to urge the first base away from the fifth bias assembly.

A6. The apparatus of paragraph A5, wherein the base plate extends as a raised portion between the fourth biasing assembly and the fifth biasing assembly.

A7. The apparatus of paragraph A6, wherein the fifth bias assembly is supported relative to the base plate at a position spaced beyond the first passageway.

A8. The apparatus of paragraph A4, wherein the first, second, third and fourth bias assemblies comprise a first biasing station for supporting the first splice component relative to the base plate, the apparatus further comprises a plurality of biasing stations including the first biasing station, and each biasing station of the plurality of biasing stations is configured to support a respective splice component having a respective protrusion in a respective passageway relative to the base plate.

A9. The apparatus of paragraph A2, wherein the base plate includes a second passageway spaced from the first passageway and extending through the base plate, and a second barrier element mounted proximate to the second passageway, the second passageway and second barrier element are configured to freely receive a second protrusion of a second splice component; and the apparatus further comprises:
a third bias assembly mounted relative to the base plate spaced from the first bias assembly, wherein the third bias assembly includes a third bias element that extends proximate to the second passageway and is configured to move resiliently in a third direction at least partially aligned with the first direction, and extending along the first major face to urge the second protrusion against the second barrier element; and
a fourth bias assembly mounted relative to the base plate spaced from the second bias assembly, wherein the fourth bias assembly includes a fourth bias element that extends past the second major face of the base plate in a fourth direction at least partially aligned with the second direction and that is transverse to the third direction, the fourth bias assembly is configured to urge a second base of the second splice component away from the base plate;
wherein the second passageway, the second barrier element, and the third and fourth bias assemblies are configured to allow movement of the second splice component relative to the base plate transverse to the third and fourth directions.

A10. The apparatus of paragraph A9, wherein the second passageway, the second barrier element, and the third and fourth bias assemblies are configured to allow movement of the second splice component parallel to movement of the first splice component.

A11. The apparatus of paragraph A9, wherein the third direction is opposite to the first direction.

A12. The apparatus of paragraph A9, wherein the fourth direction is parallel to the second direction.

A13. The apparatus of paragraph A1, further comprising a second bias assembly mounted relative to the base plate spaced along the first passageway from the first bias assembly, wherein the second bias assembly includes a second bias element that extends into the first passageway, the second bias element is movable resiliently in a second direction at least partially aligned with the first direction and extending along the first major face, and the second bias assembly is configured to urge the first protrusion against the first barrier element; and wherein the first passageway, the first barrier element, and the first and second bias assemblies are configured to allow movement of the first splice component relative to the base plate transverse to the first and second directions.

A14. The apparatus of paragraph A13, wherein the first and second directions are parallel.

A15. The apparatus of paragraph A1, wherein the base plate includes a second passageway spaced from the first passageway and extending through the base plate, and a second barrier element mounted proximate to the second passageway, the second passageway and second barrier element are configured to freely receive a second protrusion of a second splice component; and the apparatus further comprises a second bias assembly mounted relative to the base plate spaced from the first bias assembly, wherein the second bias assembly includes a second bias element that extends proximate to the second passageway and is configured to move resiliently in a second direction at least partially aligned with the first direction, and extending along the first major face, the second bias assembly is configured to urge the second protrusion against the second barrier element; and the second passageway, the second barrier element, and the second bias assembly are configured to allow movement of the second splice component relative to the base plate transverse to the second direction.

A16. The apparatus of paragraph A1, wherein the base plate is configured so that a first base of the first splice component extends along the second major face of the base plate with the first protrusion extending into the first passageway between the first bias element and the first barrier element.

B1. An apparatus for mounting at least a first fitting of a splice of a fuselage structure, where the fuselage structure comprises:
 a first panel;
 a strap mounted on the first panel and extending along a first edge of the first panel;
 a first stringer mounted on the first-panel and extending away from the first edge of the first panel; and
 a first fitting having a first protrusion, the apparatus comprising:
 a base plate having opposite first and second base-plate major faces, a first passageway extending through the base plate, and a first barrier element mounted proximate to the first passageway, wherein the first passageway and first barrier element are configured to freely receive a first protrusion of the first fitting; and
 a first bias assembly mounted relative to the base plate, wherein the first bias assembly includes a first bias element that extends proximate to the first passageway, configured to move resiliently in a first direction extending along the base-plate first major face to urge the first protrusion against the first barrier element;
 wherein the first passageway, the first barrier element, and the first bias assembly are configured to allow movement of the first fitting relative to the base plate transverse to the first direction.

B2. The apparatus of paragraph B1, where a first base of the first fitting extends along the second base-plate major face when the first protrusion extends into the first passageway, and the apparatus further comprises a second bias assembly mounted relative to the base plate, wherein the second bias assembly includes a second bias element that extends past the second base-plate major face in a second direction that is transverse to the first direction, and the second bias assembly is configured to urge the first base away from the base plate.

B3. The apparatus of paragraph B2, further comprising:
 a third bias assembly mounted relative to the base plate spaced from the first bias assembly, wherein the third bias assembly includes a third bias element that extends into the first passageway, is configured to move resiliently in a third direction at least partially aligned with the first direction, and extending along the first major face, and the third bias assembly is configured to urge the first protrusion against the first barrier element; and
 a fourth bias assembly mounted relative to the base plate spaced from the second bias assembly, wherein the fourth bias assembly includes a fourth bias element that extends past the second base-plate major face of the base plate in a fourth direction at least partially aligned with the second direction and that is transverse to the first and third directions, and the fourth bias assembly is configured to urge the first base away from the base plate;
 wherein the first passageway, the first barrier element, and the first, second, third, and fourth biasing assemblies are configured to allow movement of the first base along the second major face transverse to the first, second, third and fourth directions.

B4. The apparatus of paragraph B2, wherein the base plate includes a second passageway spaced from the first passageway and extending through the base plate, and a second barrier element mounted proximate to the second passageway, the second passageway and second barrier element are configured to freely receive a second protrusion of a second fitting; and the apparatus further comprises:
 a third bias assembly mounted relative to the base plate spaced from the first bias assembly, wherein the third bias assembly includes a third bias element that extends proximate to the second passageway and is configured to move resiliently in a third direction at least partially aligned with the first direction, and extending along the first major face, to urge the second protrusion against the second barrier element; and
 a fourth bias assembly mounted relative to the base plate spaced from the second bias assembly, wherein the fourth bias assembly includes a fourth bias element that extends past the second major face of the base plate in a fourth direction at least partially aligned with the second direction and that is transverse to the third direction and the first line, the fourth bias assembly is configured to urge a second base of the second fitting away from the base plate;
 wherein the second passageway, the second barrier element, and the third and fourth bias assemblies are configured to allow movement of the second fitting relative to the base plate transverse to the third and fourth directions.

B5. The apparatus of paragraph B1, further comprising a second bias assembly mounted relative to the base plate spaced along the first passageway from the first bias assembly, wherein the second bias assembly includes a second bias element that extends into the first passageway, the second bias element is movable resiliently in a second direction at least partially aligned with the first direction and extending along the first major face, and the second bias assembly is configured to urge the first protrusion against the first barrier element; and wherein the first passageway, the first barrier element, and the first and second bias assemblies are configured to allow movement of the first fitting relative to the base plate transverse to the first and second directions.

B6. The apparatus of paragraph B1, where the first panel defines a panel concave surface extending along the first edge and the first edge extends about a circumference of the fuselage structure, and the strap defines a corresponding strap concave surface, and wherein the second base-plate major face defines a base-plate convex surface complementing the strap concave surface.

C1. A method for installing at least a first splice component for splicing at least first and second workpieces together, comprising:
 supporting the first splice component on an installation tool having a base plate with opposite first and second major faces by:
  positioning a first protrusion of the first splice component in a first passageway extending through the base plate and between a first bias element of a first biasing assembly mounted relative to the base plate and a first barrier element mounted to the base plate proximate to the first passageway, and
  urging the first protrusion against the first barrier element by resiliently urging the first bias element against the first protrusion in a first direction extending along the first major face;
 positioning the installation tool while supporting the first splice component with the first splice component proximate to the first and second workpieces; and attaching the first splice component to the first and second workpieces.

C2. The method of paragraph C1, further comprising, after positioning the installation tool while supporting the first splice component, moving the first splice component relative to the base plate along a first line transverse to the first direction.

C3. The method of paragraph C2, further comprising, after positioning the installation tool while supporting the first splice component, fastening the tool to at least the first workpiece with a set of fastening elements.

C4. The method of paragraph C3, further comprising, after attaching the first splice component to the first and second workpieces, removing the set of fastening elements and removing the tool from the first splice component.

C5. The method of paragraph C1, further comprising, after positioning the installation tool while supporting the first splice component, urging a first base of the first splice component toward at least one workpiece of the first and second workpieces by resiliently urging a second bias element of a second biasing assembly mounted relative to the base plate against the first base of the first splice component in a second direction away from the second major face of the base plate and toward the at least one workpiece.

C6. The method of paragraph C5, wherein supporting the first splice component further includes:
 positioning the first protrusion between a third bias element of a third biasing assembly mounted relative to the base plate and spaced along the first passageway from the first biasing assembly, and a second barrier element mounted to the base plate proximate to the first passageway, and
 urging the first protrusion against the second barrier element by resiliently urging the third bias element against the first protrusion in a third direction extending along the first major face; and
 the method further comprising, after positioning the installation tool while supporting the first splice component, urging the first base of the first splice component toward the at least one workpiece by resiliently urging a fourth bias element of a fourth biasing assembly in a fourth direction away from the second major face of the base plate and toward the at least one workpiece.

C7. The method of paragraph C5, where the first, second, third and fourth bias assemblies comprise a first biasing station for supporting the first splice component relative to the base plate and the installation tool includes a plurality of biasing stations including the first biasing station, and the method further comprises supporting a plurality of splice components including the first splice component by the plurality of biasing stations, and each biasing station of the plurality of biasing stations is configured to support a respective protrusion of a respective splice component in a respective passageway relative to the base plate.

C8. The method of paragraph C1, further comprising:
 supporting a second splice component on the installation tool by:
  positioning a second protrusion of the second splice component in a second passageway spaced from the first passageway and extending through the base plate and between a second bias element of a second biasing assembly mounted relative to the base plate and a second barrier element mounted to the base plate proximate to the second passageway, and
  urging the second protrusion against the second barrier element by resiliently urging the second bias element against the second protrusion in a second direction at least partially aligned with the first direction and extending along the first major face;
 positioning the installation tool while supporting the second splice component with the second splice component proximate to third and fourth workpieces; and
 attaching the second splice component to the third and fourth workpieces.

D1. A method of making a fuselage structure splice comprising the steps of:
 supporting a fitting on an installation tool having a base plate with first and second opposite major faces by:
  positioning a protrusion of the first fitting in a first passageway extending through the base plate and between a first bias element of a first biasing assembly mounted relative to the base plate and a first barrier element mounted to the base plate proximate to the first passageway, and
  urging the protrusion against the first barrier element by resiliently urging the first bias element against the protrusion in a first direction extending along the first major face;
 positioning the installation tool, while supporting the fitting, with the fitting proximate to a strap extending along an edge of a panel and a stringer extending away from the edge of the panel;
 attaching the fitting to the strap and the stringer.

D2. The method of paragraph D1, further comprising, after positioning the installation tool while supporting the fitting, moving the fitting relative to the base plate transverse to the first direction.

D3. The method of paragraph D2, further comprising, after positioning the installation tool while supporting the fitting, fastening the tool to at least the strap with a set of fastening elements.

D4. The method of paragraph D3, further comprising, after attaching the fitting to the strap and the stringer, removing the set of fastening elements and removing the tool from the fitting.

D5. The method of paragraph D1, further comprising, after positioning the installation tool while supporting the fitting, urging a base of the fitting toward at least the strap by resiliently urging a second bias element of a second biasing assembly mounted relative to the base plate against the base of the fitting in a second direction away from the second major face of the base plate and toward at least the strap.

Advantages, Features, and Benefits

The different examples of the apparatus for installation of components of a splice, such as a fuselage structure splice, described herein provide several advantages over known solutions for installing splice components at a splice joint. For example, illustrative examples describe an assembly tool, which allows for a forward-aft movement of at least one splice component, while supporting the splice component to facilitate assembly of an overall shimless joint. Furthermore, illustrative embodiments and examples described herein allow for positioning assembly tool to align the positions and orientations of the splice component surfaces with contacted fuselage workpieces.

Additionally, and among other benefits, illustrative examples described herein may reduce or eliminate the need for shims and fillers during the making of the fuselage structure splice; may facilitate quicker and easier installation of multiple splice components at one time while allowing for manipulation of the individual splice components to obtain mating of splice component surfaces with the fuselage section surfaces before fastening.

No known system or device can perform these functions, particularly in receiving and supporting a splice component and allowing for forward-aft movement of the splice component to facilitate assembly of an overall shim less joint. Thus, the illustrative examples described herein are particularly useful for a fuselage structure splice. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An apparatus for mounting at least a first splice component for
joining two workpieces, comprising:
a base plate having opposite first and second major faces,
a first passageway extending through the base plate, and a first barrier element mounted proximate to the first passageway, wherein the first passageway and the first barrier element are configured to freely receive a first protrusion of the first splice component; and
a first bias assembly mounted relative to the base plate, wherein the first bias assembly includes a first bias element that extends proximate to the first passageway and is configured to move resiliently in a first direction extending along the first major face to urge the first protrusion against the first barrier element;
wherein the first passageway, the first barrier element, and the first bias assembly are configured to allow movement of the first splice component relative to the base plate transverse to the first direction.

2. The apparatus of claim 1, wherein a first base of the first splice component extends along the second major face when the first protrusion extends into the first passageway, and the apparatus further comprises a second bias assembly mounted relative to the base plate, wherein the second bias assembly includes a second bias element that extends past the second major face of the base plate in a second direction that is transverse to the first direction, and the second bias assembly is configured to urge the first base away from the base plate.

3. The apparatus of claim 2, wherein the first passageway, the first barrier element, and the first bias assembly are configured to allow movement of the first protrusion along the first major face.

4. The apparatus of claim 2, further comprising:
a third bias assembly mounted relative to the base plate spaced from the first bias assembly, wherein the third bias assembly includes a third bias element that extends into the first passageway, is configured to move resiliently in a third direction at least partially aligned with the first direction and extending along the first major face, and the third bias assembly is configured to urge the first protrusion against the first barrier element; and
a fourth bias assembly mounted relative to the base plate spaced from the second bias assembly, wherein the fourth bias assembly includes a fourth bias element that extends past the second major face of the base plate in a fourth direction at least partially aligned with the second direction and that is transverse to the first and third directions, and the fourth bias assembly is configured to urge the first base away from the base plate;
wherein the first passageway, the first barrier element, and the first, second, third, and fourth bias assemblies are configured to allow movement of the first base along the second major face transverse to the first, second, third, and fourth directions.

5. The apparatus of claim 4, wherein the first, second, third and fourth bias assemblies comprise a first biasing station for supporting the first splice component relative to the base plate, the apparatus further comprises a plurality of biasing stations including the first biasing station, and each biasing station of the plurality of biasing stations is configured to support a respective splice component having a respective protrusion in a respective passageway relative to the base plate.

6. The apparatus of claim 2, wherein the base plate includes a second passageway spaced from the first passageway and extending through the base plate, and a second barrier element mounted proximate to the second passageway, the second passageway and second barrier element are configured to freely receive a second protrusion of a second splice component; and the apparatus further comprises:
a third bias assembly mounted relative to the base plate spaced from the first bias assembly, wherein the third bias assembly includes a third bias element that extends proximate to the second passageway and is configured to move resiliently in a third direction at least partially aligned with the first direction, and extending along the first major face to urge the second protrusion against the second barrier element; and
a fourth bias assembly mounted relative to the base plate spaced from the second bias assembly, wherein the fourth bias assembly includes a fourth bias element that extends past the second major face of the base plate in a fourth direction at least partially aligned with the second direction and that is transverse to the third direction, the fourth bias assembly is configured to urge a second base of the second splice component away from the base plate;
wherein the second passageway, the second barrier element, and the third and fourth bias assemblies are configured to allow movement of the second splice component relative to the base plate transverse to the third and fourth directions.

7. The apparatus of claim 6, wherein the second passageway, the second barrier element, and the third and fourth bias assemblies are configured to allow movement of the second splice component parallel to movement of the first splice component.

8. The apparatus of claim 6, wherein the third direction is opposite to the first direction.

9. The apparatus of claim 6, wherein the fourth direction is parallel to the second direction.

10. The apparatus of claim 1, further comprising a second bias assembly mounted relative to the base plate spaced along the first passageway from the first bias assembly, wherein the second bias assembly includes a second bias element that extends into the first passageway, the second bias element is movable resiliently in a second direction at least partially aligned with the first direction and extending along the first major face, and the second bias assembly is configured to urge the first protrusion against the first barrier element; and
wherein the first passageway, the first barrier element, and the first and second bias assemblies are configured to allow movement of the first splice component relative to the base plate transverse to the first and second directions.

11. The apparatus of claim 1, wherein the base plate includes a second passageway spaced from the first passageway and extending through the base plate, and a second barrier element mounted proximate to the second passageway, the second passageway and second barrier element are configured to freely receive a second protrusion of a second splice component; and the apparatus further comprises a second bias assembly mounted relative to the base plate spaced from the first bias assembly, wherein the second bias assembly includes a second bias element that extends proximate to the second passageway and is configured to move resiliently in a second direction at least partially aligned with the first direction, and extending along the first major face, the second bias assembly is configured to urge the second protrusion against the second barrier element; and the second passageway, the second barrier element, and the second bias assembly are configured to allow movement of the second splice component relative to the base plate transverse to the second direction.

12. The apparatus of claim 1, wherein the base plate is configured so that a first base of the first splice component extends along the second major face of the base plate with the first protrusion extending into the first passageway between the first bias element and the first barrier element.

13. An apparatus for mounting at least a first fitting of a splice of a fuselage structure, where the fuselage structure comprises:
a first panel;
a strap mounted on the first panel and extending along a first edge of the first panel;
a first stringer mounted on the first panel and extending away from the first edge of the first panel; and
a first fitting having a first protrusion, the apparatus comprising:
a base plate having opposite first and second base-plate major faces, a first passageway extending through the base plate, and a first barrier element mounted proximate to the first passageway, wherein the first passageway and first barrier element are configured to freely receive a first protrusion of the first fitting; and
a first bias assembly mounted relative to the base plate, wherein the first bias assembly includes a first bias element that extends proximate to the first passageway, configured to move resiliently in a first direction extending along the base-plate first major face to urge the first protrusion against the first barrier element;
wherein the first passageway, the first barrier element, and the first bias assembly are configured to allow movement of the first fitting relative to the base plate transverse to the first direction.

14. The apparatus of claim 13, wherein a first base of the first fitting extends along the second base-plate major face when the first protrusion extends into the first passageway, and the apparatus further comprises a second bias assembly mounted relative to the base plate, wherein the second bias assembly includes a second bias element that extends past the second base-plate major face in a second direction that is transverse to the first direction, and the second bias assembly is configured to urge the first base away from the base plate.

15. The apparatus of claim 13, further comprising a second bias assembly mounted relative to the base plate spaced along the first passageway from the first bias assembly, wherein the second bias assembly includes a second bias element that extends into the first passageway, the second bias element is movable resiliently in a second direction at least partially aligned with the first direction and extending along the first base-plate major face, and the second bias assembly is configured to urge the first protrusion against the first barrier element; and
wherein the first passageway, the first barrier element, and the first and second bias assemblies are configured to allow movement of the first fitting relative to the base plate transverse to the first and second directions.

16. The apparatus of claim 13, wherein the first panel defines a panel concave surface extending along the first edge and the first edge extends about a circumference of the fuselage structure, and the strap defines a corresponding strap concave surface, and wherein the second base-plate major face defines a base-plate convex surface complementing the strap concave surface.

17. A method for installing at least a first splice component for splicing at least first and second workpieces together, comprising:
supporting the first splice component on an installation tool having a base plate with opposite first and second major faces by:
positioning a first protrusion of the first splice component in a first passageway extending through the base plate and between a first bias element of a first biasing assembly mounted relative to the base plate and a first barrier element mounted to the base plate proximate to the first passageway, and urging the first protrusion against the first barrier element by resiliently urging the first bias element against the first protrusion in a first direction extending along the first major face;

positioning the installation tool while supporting the first splice component with the first splice component proximate to the first and second workpieces;

configuring the first passageway, the first barrier element, and the first biasing assembly to allow movement of the first splice component relative to the base plate transverse to the first direction; and attaching the first splice component to the first and second workpieces.

18. The method of claim 17, further comprising, after positioning the installation tool while supporting the first splice component, moving the first splice component relative to the base plate along a first line transverse to the first direction.

19. The method of claim 17, further comprising, after positioning the installation tool while supporting the first splice component, urging a first base of the first splice component toward at least one workpiece of the first and second workpieces by resiliently urging a second bias element of a second biasing assembly mounted relative to the base plate against the first base of the first splice component in a second direction away from the second major face of the base plate and toward the at least one workpiece.

20. The method of claim 17, further comprising:

supporting a second splice component on the installation tool by:

positioning a second protrusion of the second splice component in a second passageway spaced from the first passageway and extending through the base plate and between a second bias element of a second biasing assembly mounted relative to the base plate and a second barrier element mounted to the base plate proximate to the second passageway, and urging the second protrusion against the second barrier element by resiliently urging the second bias element against the second protrusion in a second direction at least partially aligned with the first direction and extending along the first major face;

positioning the installation tool while supporting the second splice component with the second splice component proximate to third and fourth workpieces; and attaching the second splice component to the third and fourth workpieces.

* * * * *